(12) United States Patent
Duong

(10) Patent No.: US 10,289,927 B2
(45) Date of Patent: May 14, 2019

(54) IMAGE INTEGRATION SEARCH BASED ON HUMAN VISUAL PATHWAY MODEL

(71) Applicant: Adaptive Computation, LLC, Glendora, CA (US)

(72) Inventor: Tuan A. Duong, Glendora, CA (US)

(73) Assignee: Adaptive Computation, LLC, Glendora, AZ (US)

(*) Notice: Subject to any disclaimer, the term of this patent is extended or adjusted under 35 U.S.C. 154(b) by 0 days.

(21) Appl. No.: 15/843,273

(22) Filed: Dec. 15, 2017

(65) Prior Publication Data

US 2018/0107873 A1 Apr. 19, 2018

Related U.S. Application Data

(63) Continuation of application No. 14/986,572, filed on Dec. 31, 2015, now Pat. No. 9,846,808.

(51) Int. Cl.
*G06K 9/46* (2006.01)
*G06K 9/62* (2006.01)
(Continued)

(52) U.S. Cl.
CPC ..... *G06K 9/4671* (2013.01); *G06F 17/30256* (2013.01); *G06K 9/0061* (2013.01);
(Continued)

(58) Field of Classification Search
CPC ....... G06K 2009/4666; G06K 9/00476; G06K 9/0063; G06K 9/46; G06K 9/6215; G06K 9/6253; G06K 9/00979; G06K 9/00993; G06K 9/186; G06K 9/00; G06K 9/00268; G06K 9/00335; G06K 9/0061; G06K 9/00617; G06K 9/00288; G06K 9/62; G06K 9/627; G06K 9/00248; G06K 9/6267; G06K 9/00302; G06K 9/00624; G06K 9/00684;
(Continued)

(56) References Cited

U.S. PATENT DOCUMENTS 6,215,890 B1 * 4/2001 Matsuo ................... G06F 3/017
382/103
8,224,095 B2 * 7/2012 Kanoh ................. G06K 9/2054
382/100

(Continued)

*Primary Examiner* — Aklilu K Woldemariam
(74) *Attorney, Agent, or Firm* — Schwabe, Williamson & Wyatt, P.C.

(57) ABSTRACT

Methods, systems, and storage media are disclosed herein for determining objects in image data that match a plurality of captured images, in which one or more of the captured images from among the plurality of captured images may depict only a portion of an object. A computing device may extract a first feature from at least one block of the plurality of blocks from a captured image; determine a second feature; and determine a third feature. The computing device may determine, as a matching image, a stored image from among a plurality of stored images including an object that has greatest maximum correlation with the third feature. The computing device may similarly determine a matching image for each of the captured images of the plurality of images; and determine a final matching image from among the candidate matching images that best matches the combination of the plurality of captured images.

20 Claims, 17 Drawing Sheets

(51) Int. Cl.

| | |
|---|---|
| *G06T 7/11* | (2017.01) |
| *G06K 9/00* | (2006.01) |
| *G06K 9/52* | (2006.01) |
| *G06K 9/66* | (2006.01) |
| *G06T 3/40* | (2006.01) |
| *G06F 17/30* | (2006.01) |

(52) U.S. Cl.
CPC ..... *G06K 9/00268* (2013.01); *G06K 9/00335* (2013.01); *G06K 9/00597* (2013.01); *G06K 9/00617* (2013.01); *G06K 9/4628* (2013.01); *G06K 9/52* (2013.01); *G06K 9/6211* (2013.01); *G06K 9/66* (2013.01); *G06T 3/40* (2013.01); *G06T 7/11* (2017.01); *G06K 9/00* (2013.01); *G06K 2009/4666* (2013.01); *G06T 2207/20021* (2013.01); *G06T 2207/30201* (2013.01)

(58) Field of Classification Search
CPC .... G06K 9/52; G06K 9/6201; G06K 2209/27; G06K 9/00832; G06K 9/00362; G06K 9/00369; G06K 2209/01; A61B 5/0077; A61B 5/444; A61B 5/7425; A61B 2576/02; A61B 5/0075; A61B 5/1032; A61B 5/1034; A61B 5/441; A61B 5/445; A61B 5/4806; A61B 5/6898; A61B 5/7246; A61B 5/7278; A61B 5/7282; G06F 17/30241; G06F 17/30259; G06N 7/005
USPC .......... 382/100, 118, 156, 220, 294
See application file for complete search history.

(56) References Cited

U.S. PATENT DOCUMENTS

| | | | | |
|---|---|---|---|---|
| 8,935,322 | B1* | 1/2015 | Grosz | G06F 3/04842 709/203 |
| 9,129,148 | B1* | 9/2015 | Li | G06K 9/00268 |
| 2002/0001393 | A1* | 1/2002 | Jones | G06K 9/00979 382/100 |
| 2004/0228503 | A1* | 11/2004 | Cutler | G06K 9/00348 382/103 |
| 2010/0098342 | A1* | 4/2010 | Davis | G06K 9/0063 382/220 |
| 2010/0309226 | A1* | 12/2010 | Quack | G06F 17/30244 345/634 |
| 2011/0182517 | A1* | 7/2011 | Farsiu | A61B 5/0066 382/190 |
| 2011/0282897 | A1* | 11/2011 | Li | G06F 17/30241 707/769 |
| 2014/0079297 | A1* | 3/2014 | Tadayon | G06K 9/00 382/118 |
| 2014/0193047 | A1* | 7/2014 | Grosz | G06F 3/1242 382/118 |
| 2014/0201126 | A1* | 7/2014 | Zadeh | G06K 9/627 706/52 |
| 2014/0355861 | A1* | 12/2014 | Nirenberg | H04N 19/85 382/133 |
| 2014/0378810 | A1* | 12/2014 | Davis | G06T 5/40 600/407 |
| 2015/0269439 | A1* | 9/2015 | Versace | G06K 9/00664 382/103 |
| 2015/0269456 | A1* | 9/2015 | Yang | G06K 9/6215 382/219 |
| 2015/0317511 | A1* | 11/2015 | Li | G06K 9/00288 382/118 |

\* cited by examiner

IMAGE INTEGRATION SEARCH BASED ON HUMAN VISUAL PATHWAY MODEL

CROSS-REFERENCE TO RELATED APPLICATIONS

The present application is a Continuation Application of U.S. application Ser. No. 14/986,572, filed Dec. 31, 2015, and issued as U.S. Pat. No. 9,846,808 on Dec. 19, 2017, the contents of each of which are hereby incorporated by reference in their entireties for all purposes. The present application is also related to U.S. application Ser. No. 14/986,057, filed Dec. 31, 2015, the contents of which is hereby incorporated by reference herein in its entirety for all purposes.

FIELD

The present disclosure relates to the fields of image processing, and in particular, to apparatuses, methods, and storage media associated with image recognition and searching.

BACKGROUND

The background section provided herein is for the purpose of generally presenting the context of the disclosure. Unless otherwise indicated herein, the materials described in this section are not prior art to the claims in this application and are not admitted to be prior art by inclusion in this section.

Human visual systems are versatile and flexible, capable of identifying objects in a dynamic real world environment. Rapid and accurate object recognition is achieved even though parts of the human visual system (e.g., eyes) may be fatigued, humans are unable to process information at high speeds, there is limited object information to process, and/or the inability to memorize large amount of information at any given time.

Attempts to replicate human object recognition capabilities using computers have been of limited success. Some object recognition algorithms identify objects in an image or video by extracting landmarks, or features, from the image or video. Such object recognition algorithms may be referred to as geometric algorithms. For example, geometric facial recognition algorithm may identify facial features by extracting landmarks/features from an image of a human face, and may analyze the relative position, size, and/or shape of the eyes, nose, cheekbones, jaw, lips, and/or other facial features of the human face in the image (the person or object in an image may be referred to as the "subject of the image" or "subject", and the image representing the person or object to be identified may be referred to as a "subject image"). However, geometric algorithms typically require high resolution and/or low noise images in order to properly detect objects or facial features within the image. Additionally, geometric facial recognition algorithms usually require a complete picture of a subject in order to determine the relative position, size, and/or shape of the facial features of the subject. Furthermore, such algorithms typically require a relatively large set of sample images upon which to compare any identify object against in order to determine the identity of a subject. Moreover, geometric facial recognition algorithms may encounter errors when the subject image has different dimensions than the dimensions of a sample set of images. In such instances, the subject image may have to be translated (for example, scaled, rotated, skewed, and the like) to fit the dimensions of sample images.

Object recognition is further complicated when used in the context of image searching. Most of the object recognition algorithms are directed to recognition of whole objects. Searching for an object based on detection or input of only a part of the object is more complex than when the whole object is provided as the input. Searching based on partial object inputs is even more difficult when the inputs are of potentially arbitrary partial objects, overlapping pieces of partial objects, and/or non-overlapping pieces of partial objects.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
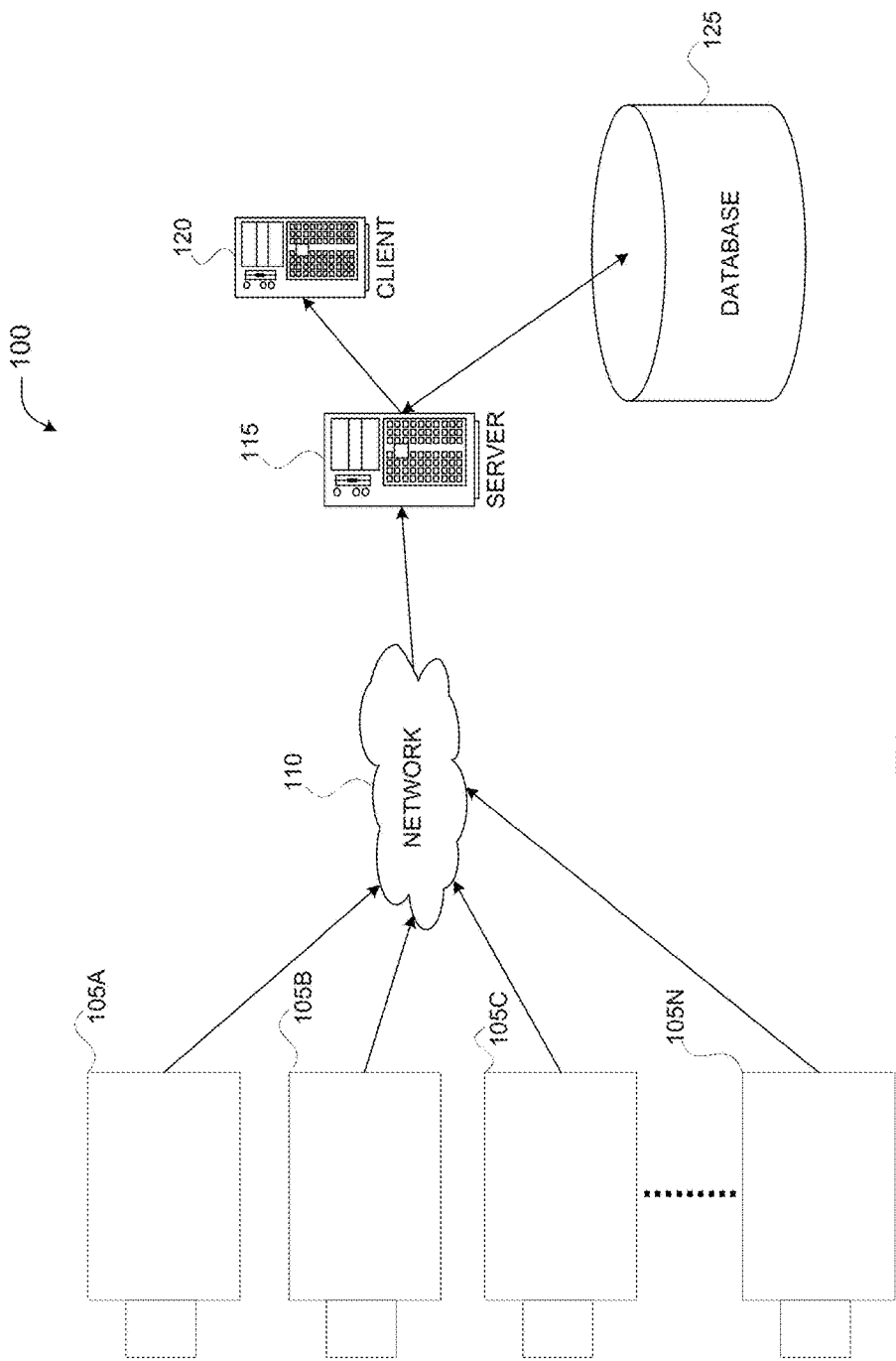
FIG. 1 illustrates an example arrangement in which example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, one or more processors (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

Example embodiments disclosed herein provide systems and methods for object recognition in image or video data. The example embodiments may be considered to be a bio-inspired model that emulates saccadic eye movements and extracts features from captured image data based on a biological visual pathway, such as by emulating the retina, fovea, and lateral geniculate nucleus (LGN) of a vertebrate. In embodiments, an input image is provided to a saccadic eye emulator that may sequentially scan the input image to focus on one or more objects of interest and/or features within the object (e.g., when the input image includes a person, the saccadic eye emulator may focus on the eyes, nose, lips, etc., of the face of the person). Statistical data of components within the object (e.g., one or more features) may be constructed from different locations of different light intensity of the input image. In embodiments, the saccadic eye emulator generates a set of images or blocks in different locations of the input image. Principal component analysis (PCA) and/or feature extraction algorithms (FEA) may be used to obtain vertebrate features and fovea features, which are based on vertebrate retina horizontal cells and retinal ganglion cells, respectively.

Example embodiments disclosed herein further provide systems and methods for identifying whole objects based on one or more (partial) object images. The bio-inspired model for extracting vertebrate features, fovea features, and LGN features is used to process one or both of the input images that form the query request and the stored images of objects in a database from which the query results will be obtained. In some embodiments, one or more searches are conducted in the stored images in the database for each image of the input images that form the query request independently of other images of the input images. And then the results of such independent searches are analyzed to determine best matches to the combination of all of the images forming the query request.

FIG. 1 illustrates an arrangement 100, according to an example embodiment. The arrangement 100 includes image capture devices 105-1-105-N, network 110, server 115, client device 120, and database 125.

Each of the image capture devices 105-1-105-N (where N≥1) (hereinafter referred to as "image capture devices 105" or "image capture device 105") may be any device capable of capturing images and/or video data. For example, in various embodiments, image capture devices 105 may include optical cameras including an optical lens and one or more digital image sensors, such as a charge-coupled device (CCD), a complementary metal-oxide-semiconductor (CMOS) sensor chip, active-pixel sensor (APS), and/or any other suitable image capture device. In some embodiments, image capture devices 105 may include thermographic (infrared) cameras, which may be similar to optical-lens cameras, but instead operate in wavelengths in the infrared range of the electromagnetic spectrum. In some embodiments, image capture devices 105 may include a lens-less image capture mechanism, which may include an aperture assembly and a sensor. The aperture assembly may include a two dimensional array of aperture elements, and the sensor may be a single detection element, such as a single photoconductive cell. Each aperture element together with the sensor may define a cone of a bundle of rays, and the cones of the aperture assembly define the pixels of an image.

In some embodiments, the image capture devices 105 may also include one or more processors, one or more memory devices, and one or more communications modules. The one or more memory devices may be one or more computer readable storage medium that generally includes a computer readable storage medium that generally includes a random access memory (RAM), read only memory (ROM), a flash memory device, a solid state disk (SSD), a secure digital (SD) card, and/or other like storage media capable of storing and recording data. The one or more processors may include any combination of general-purpose processors and/or dedicated processors (for example, graphics processors, application processors, one or more ASICs, etc.). The processors may be coupled with the one or more memory devices and configured to execute instructions stored in the one or more memory devices to enable various applications and/or operating systems running on the system. Such applications and/or operating systems may allow the image capture devices 105 to capture an image, and process and/or record/store such images, for example by encoding and/or compressing a source signal and/or captured video using any suitable compression algorithm. In other embodiments, the image capture devices 105 may capture images and transmit the captured images to the server 115 as raw data. The captured images may be transmitted to the server 115 using the one or more communications modules. Each of the one or more communications modules may connect the image capture devices 105 to a computer network (e.g., network 110) via a wired or wireless connection. Some of the one or more communications modules may operate in conjunction with corresponding network interface and/or a wireless transmitter/receiver and/or transceiver (not shown) that is configured to operate in accordance with one or more wireless standards. Each wireless transmitter/receiver and/or transceiver may be configured to operate in accordance with a wireless communications standard, such as the Global System for Mobile Communications (GSM), Long Term Evolution (LTE), Bluetooth, Wireless Fidelity (Wi-Fi) such as the Institute of Electrical and Electronics Engineers (IEEE) 802.11 protocols, voice over Internet Protocol (VoIP), Wi-MAX, and/or any other "wireless" communication protocols, including RF-based, optical, and so forth. Some of the one or more communications modules may operate in conjunction with corresponding network interface that is configured to operate in accordance with one or more wired communications standards or protocols, such as a serial communications protocol (e.g., the USB, FireWire, SDI, and/or other like serial communications protocols), a parallel communications protocol (e.g., IEEE 1284, CAMAC, and/or other like parallel communications protocols), and/or a network communications protocol (e.g., Ethernet, token ring, fiber distributed data interface (FDDI), and/or other like network communications protocols). The communication modules may also include one or more virtual network interfaces configured to operate with various image capture and/or image processing applications.

Network 110 may be any network that allows computers to exchange data. Network 110 may include one or more network elements (not shown) capable of physically or logically connecting computers. In various embodiments, network 110 may be the Internet, a Wide Area Network (WAN), a personal area network (PAN), local area network (LAN), campus area network (CAN), metropolitan area network (MAN), a virtual local area network (VLAN), or other like networks capable of physically or logically connecting computers. Additionally, in various embodiments, network 110 may be a private and/or secure network, which is used by a single organization (e.g., a business, a school, a government agency, and the like).

Server 115 is a computing device that may include one or more systems and/or applications for processing a source signal, image data, and/or video data (e.g., a signal, image, or video captured by at least one of the image capture devices 105) for object recognition in the source signal. Server 115 may include a processor, memory or computer readable storage medium, network interface, and other like hardware components. The server 115 may be any computing device capable of receiving and responding to requests from one or more client devices (e.g., client 120) across a computer network (e.g., network 110) to provide one or more services. Accordingly, server 115 may be configured to communicate with the image capture devices 105 and client 120 via a wired or wireless protocol, which may be the same or similar to the wired and wireless protocols discussed previously. Additionally, server 115 may be a single physical hardware device, or server 115 may include a plurality of physically or logically connected computing devices, such that the server 115 may reside on one or more physical hardware devices. In various embodiments, server 115 is configured to operate a bio-inspired feature extraction engine (BIFEE) 500 (discussed with regard to FIGS. 3-4) to extract one or more features from a received source signal, image, and/or video stream, as captured and/or recorded by the image capture devices 105; compare the extracted feature(s) with features of objects or persons of stored images (e.g., stored in database 125); and determine and/or identify a person or object based on the comparison. In such embodiments, server 115 may also be configured to notify one or more client devices (e.g., client 120) when an identification has been detected by issuing a flag, alert, message or other like indication that an identification has been made.

Client device 120 may be a hardware computing device capable of communicating with a server (e.g., server 115), such that client device 120 is able to receive services from the server 115. Client device 120 may include memory, one or more processors, network interface, and/or other like hardware components. Such hardware components may be the same or similar to the memory devices, processors, network interfaces, etc., as discussed herein. Client device 120 may include devices such as desktop computers, laptop computers, cellular phones, tablet personal computers, and the like. Client device 120 may be configured to run, execute, or otherwise operate one or more applications. In some embodiments, an application may be developed by a content provider (e.g., a service provider that operates the server 115) so that a user may use the client device 120 to query or otherwise request the server 115 to identify persons or objects in a captured image. Such applications may be platform or operating system (OS) specific, which may be developed for a specific platform using platform-specific development tools, programming languages, and the like. In other embodiments, the client device 120 may query or otherwise access the server 115 using a web application that loads into a web browser of the client device 120. The web application may be any server-side application that is developed with any website development tools and/or programming languages, such as PHP, Node.js, ASP.NET, CSS, JavaScript, and/or any other like technology that renders HTML.

Database 125 may be one or more hardware devices or systems for storing image data and/or video data, as well as information related to the stored image and/or video data. Database 125 may include one or more relational database management systems (RDBMS) one or more object database management systems (ODBMS), a column-oriented DBMS, correlation database DBMS, an extensible markup language (XML) format database, and the like. According to various embodiments, the databases may be stored on or otherwise associated with one or more data storage devices.

These data storage devices may include at least one of a primary storage device, a secondary storage device, a tertiary storage device, a non-linear storage device, and/or other like data storage devices. In some embodiments, the databases may be associated with one or more systems or applications that enable querying of the databases and/or store information in the databases. Furthermore, the databases may include one or more virtual machines, such that the physical data storage devices containing the databases may be logically divided into multiple virtual data storage devices and/or databases. Alternatively, the databases may reside on one physical hardware data storage device. It should be noted that the database 125 may include one or more suitable systems and/or suitable applications for storing relevant information and providing the relevant information to one or more network devices in response to a database query. Any suitable database query language may be used to store and obtain information from database 125.

Although FIG. 1 shows one client device 120, a single server 115, and a single database 125, according to various embodiments, multiple client devices, multiple servers, and/or any number of databases may be present. Additionally, in some embodiments, client device 120, server 115, and database 125 may be virtual machines, and/or they may be provided as part of a cloud computing service. In various embodiments, client device 120, server 115, and database 125 may reside on one physical hardware device, and/or may be otherwise fully integrated with one another, such that, in various embodiments, one or more operations that are performed by server 115 may be performed by client device 120.

Figure 2:
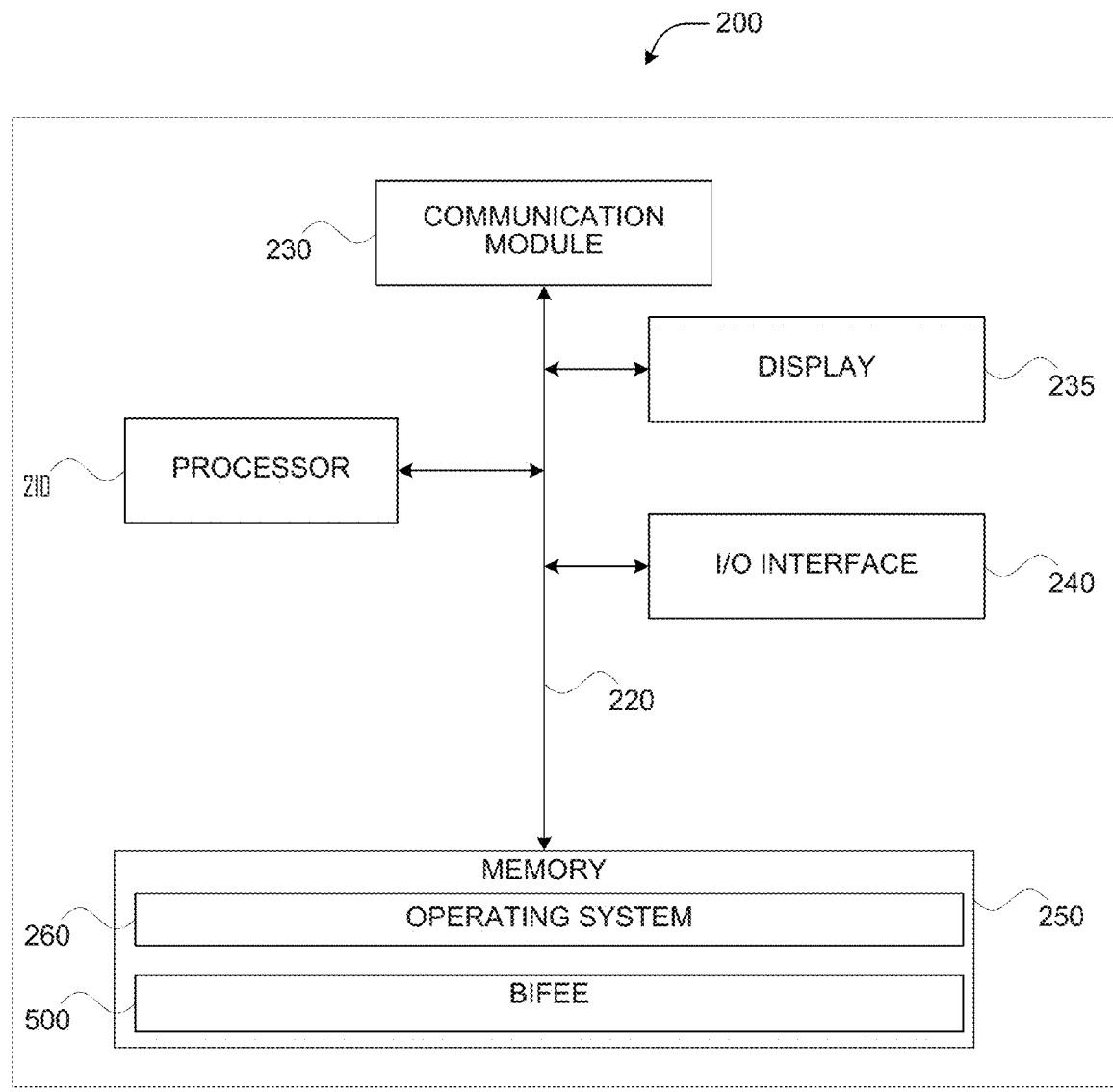
FIG. 2 illustrates the components of a computing device, in accordance with various example embodiments.

FIG. 2 illustrates the components of a computing device 200, in accordance with various example embodiments. The computing device 200 may correspond to server 115 and/or client device 120 as discussed previously with regard to FIG. 1. As shown, computing device 200 may include processor 210, memory 250, bus 220, communications module 230, input/output (I/O) interface 240, and display 235. In some embodiments, computing device 200 may include many more components than those shown in FIG. 2, such as an input device (e.g., a physical keyboard, a touch screen, etc.), and other like components. However, it is not necessary that all of these generally conventional components be shown in order to disclose the example embodiments.

Memory 250 may be a hardware device configured to store an operating system 260 and program code for one or more software components, such as BIFEE 500 and/or one or more other applications (not shown). Memory 250 may be a computer readable storage medium that generally includes a random access memory (RAM), read only memory (ROM), a flash memory device, a solid state disk (SSD), and/or other like storage media capable of storing and recording data. The program code and/or software components may also be loaded from a separate computer readable storage medium into memory 250 using a drive mechanism (not shown). Such separate computer readable storage medium may include a memory card, memory stick, removable flash drive, sim card, a secure digital (SD) card, and/or other like computer readable storage medium (not shown). In some embodiments, software components may be loaded into memory 250 via communications module 230, rather than via a computer readable storage medium.

During operation, memory 250 may include operating system 260, BIFEE 500, which includes wand duel initiation process 1400, wand duel commencement process 1500, and/or any other like processes (not shown). Operating system 460 may manage computer hardware and software resources and provide common services for computer programs. Operating system 260 may include one or more drivers that provide an interface to hardware devices thereby enabling operating system 260, BIFEE 500, and other applications to access hardware functions without needing to know the details of the hardware itself. The operating system 260 may be a general purpose operating system or an operating system specifically written for and tailored to the computing device 200. The BIFEE 500 may be a collection of software modules and/or program code that enables the computing device 200 to operate according to the various example embodiments as discussed with regard to FIGS. 3-7.

Processor 210 may be configured to carry out instructions of a computer program by performing the basic arithmetical, logical, and input/output operations of the system. The processor 210 may include a single-core processor, a dual-core processor, a triple-core processor, a quad-core processor, and the like. In embodiments where computing device 200 is to operate as a client device (e.g., client device 120), the processor 210 may also include a mobile video card and/or graphics processing unit (GPU), and/or the like. The processor 210 may perform a variety of functions for the computing device 200 and may process data by executing program code, one or more software modules, firmware, middleware, microcode, hardware description languages, and/or any other like set of instructions stored in the memory 250. The program code may be provided to processor 210 by memory 250 via bus 220, one or more drive mechanisms (not shown), and/or via communications module 230. In order to perform the variety of functions and data processing operations, the program code and/or software components may be executed by the processor 210. On execution by the processor 210, the processor 210 may cause computing device 200 to perform the various operations and functions delineated by the program code/modules, and/or software components.

For example, in various embodiments, the computing device 200 may include various modules configured to operate (through hardware and/or software) to obtain a source signal, image data, and/or video data (referred to generally as a "captured image"), generate a plurality of blocks from the captured image, wherein each block of the plurality of blocks is representative of a corresponding region of the captured image; extract a first feature (such as a vertebrate or retina feature) from at least one block of the plurality of blocks; determine a second feature (such as a fovea feature) based at least on the first feature; determine a third feature (such as an LGN feature) based on the second feature; determine, as a matching image, a stored image from among a plurality of stored images including an object that has greatest maximum correlation with the third feature; and perform various other functions according to the example embodiments disclosed herein. The various modules may include BIFEE 500, which may include the processes 500, 600, and 700 (described with regard to FIGS. 5, 6, and 7. respectively). The various modules may be loaded into memory 250 and executed by the processor 210. Once the various modules are loaded into memory 250 and executed by the processor 210, the processor 210 may be configured to perform the processes 500, 600, and/or 700 as discussed with regard to FIGS. 5-7. While specific modules are described herein, it should be recognized that, in various embodiments, various modules and/or processes may be combined, separated into separate modules and/or processes, and/or omitted. Additionally, in various embodiments, one or more modules and/or processes may be implemented on separate devices, in separate locations, or distributed, individually or in sets, across multiple processors, devices, locations, and/or in cloud-computing implementations.

Bus 220 may be configured to enable the communication and data transfer between the components of computing device 105. Bus 220 may comprise a high-speed serial bus, parallel bus, internal universal serial bus (USB), Front-Side-Bus (FSB), a PCI bus, a PCI-Express (PCI-e) bus, a Small Computer System Interface (SCSI) bus, and/or any other suitable communication technology for transferring data between components within computing device 200.

Communications module 230 may be a computer hardware component that connects computing device 105 to a computer network (e.g., network 115), such as one or more network interfaces, communications ports, and/or one or more transmitters/receivers (or alternatively one or more transceivers). The communications module 230 may be configured to operate in accordance with a wired communications protocol, such as a serial communications protocol (e.g., the USB, FireWire, SDI, and/or other like serial communications protocols), a parallel communications protocol (e.g., IEEE 1284, CAMAC, and/or other like parallel communications protocols), and/or a network communications protocol (e.g., Ethernet, token ring, (FDDI, and/or other like network communications protocols). Communications module 230 may operate in conjunction with a wireless transmitter/receiver and/or transceiver (not shown) that is configured to operate in accordance with one or more wireless standards. The wireless transmitter/receiver and/or transceiver may support communication in accordance with one or more wireless communications protocols and/or one or more cellular phone communications protocols, such as GSM, LTE, wideband code division multiple access (WCDMA), code division multiple access (CDMA), time division multiple access (TDMA), Bluetooth, Wi-Fi including IEEE 802.11a-p, Wi-MAX, and/or any other "wireless" communication protocols, including RF-based, optical, and so forth. The communications module 230 may also include one or more virtual network interfaces configured to operate with application 465 and/or other like applications. In some embodiments, the computing device 200 may obtain one or more images from one or more image capture devices 105 via the communications module 230.

I/O interface 240 may be a computer hardware component that provides communication between the computing device 200 and one or more other devices. The I/O interface 240 may include one or more user interfaces designed to enable user interaction with the computing device 200 and/or peripheral component interfaces designed to provide interaction between the computing device 200 and one or more peripheral components. Peripheral components may include, but are not limited to a physical keyboard or keypad, a touchpad, a speaker, a microphone, etc. Peripheral component interfaces may include, but are not limited to, a non-volatile memory port, a USB port, an audio jack, and a power supply interface. In some embodiments, one or more image capture devices 105 may be connected to the computing device 200 via the I/O interface 240. In such embodiments, the computing device 200 may obtain one or more images from one or more image capture devices 105 via the I/O interface 240.

Display 235 may be any type of output device that is able to present information in a visual form based on received electrical signals. Display 235 may be a light-emitting diode (LED) display device, an organic LED (OLED) display device, a liquid crystal display (LCD) device, a quantum dot display device, a projector device, and/or any other like display device. Furthermore, in various embodiments, the display device may be a touchscreen input device wherein a user may provide one or more inputs to the computing device 200 through one or more gestures by touching the display device with a stylus/pen and/or one or more fingers. The aforementioned display device technologies are generally well known, and a description of the functionality of the display 235 is omitted for brevity. However, it should be noted that, in various embodiments the display 235 may be separate from the computing device 200. In such embodiments the display 235 may be coupled with the computing device 200 by way of a wired connection, such as RCA connectors, a video graphics array (VGA) connector, a digital visual interface (DVI) connector and/or mini-DVI connector, a high-definition multimedia interface (HDMI) connector, an S-Video connector, and/or the like. Furthermore, the display 235 may be coupled with the computing device 200 via a wireless connection using one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols.

Figure 3:
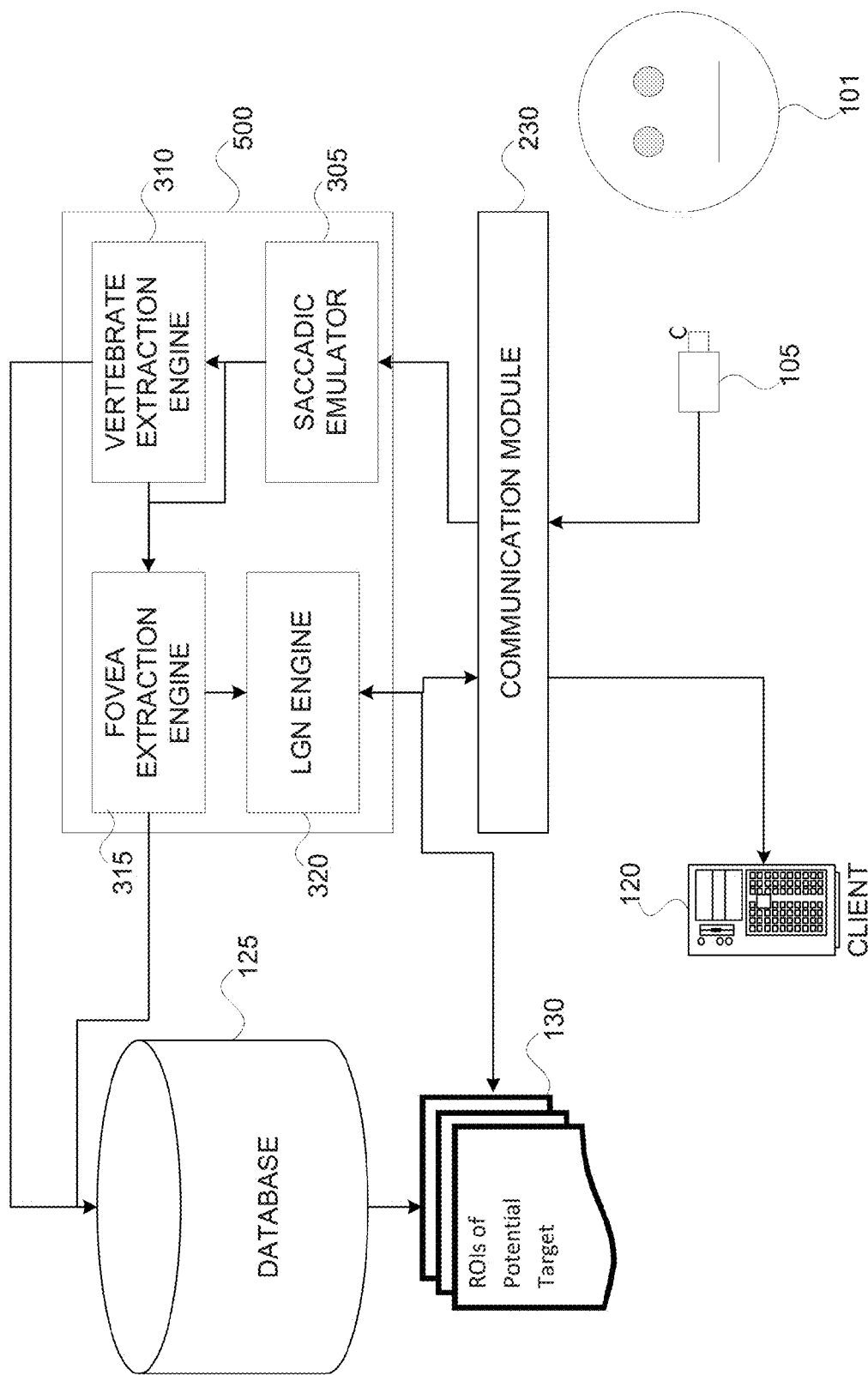
FIG. 3 illustrates example logical components and interaction points of various modules and devices, in accordance with various example embodiments.

FIG. 3 illustrates example logical components and interaction points of the BIFEE 500, in accordance with various embodiments. For illustrative purposes, the operations of the various modules shown by FIG. 3 will be described as being performed by the computing device 200 as described with respect to FIG. 2. One can view the following approach as a bio-inspired model which emulates the saccadic eye movement and a horizontal layer in the retina of a vertebrate. From this modeling, significant and salient shape features of one or more object of interest in an image can be extracted. Although FIG. 3 shows logical interactions between various modules and/or devices, according to various embodiments, additional modules may be present and/or the aforementioned modules may be combined or divided into other logical components, or replaced by other devices and/or modules. According to various example embodiments, and with reference to FIGS. 1-2, the computing device 200 including the BIFEE 500 may operate as follows.

Database 125 may store images in association with other information. For example, the database 125 may store images that were previously captured by image capture devices 105. In embodiments, the images stored in the database 125 may be "raw images" that include several objects and environment/background features, some of which may include potential target objects. Additionally, at least some of the images stored in the database 125 may be "partial images" wherein a potential target object is cutoff or obscured in the image by noise or other objects in the image. Furthermore, the database 125 may also store other image-related information. For example, in embodiments where the images stored in the database 125 are previously captured images, the image-related information may include a time stamp indicating a time at which the image was captured, geolocation information associated with the image capture device 105 that captured the image, and/or other like information.

The image capture device 105 may capture one or more images or video and/or generate image data or video data (collectively referred to as an "image" or "subject image") based on the captured images or video. The image capture device 105 may capture images based on instructions and/or queries from the client device 120 and/or the server 115, or the image capture device 105 may act autonomously with little or no operator intervention. The image capture device 105 may capture an image of subject 101, and generate image data that is representative of the subject 101. The image of the subject 101 may be a partial image of the subject 101, which may be for example, an image of only a portion of the subject's face. The image data may then be provided to the saccadic emulator 305 via the communication module 230. In some embodiments where the image capture device 105 is an optical-based image capture device, the image capture device 105 may compress and/or encode the image data prior to providing the image data to the saccadic emulator 305. In such embodiments, the computing device 200 may include a decoder (not shown) that performs various decoding and/or decompression operations and the decoded/decompressed image data may be provided to the saccadic emulator 305. In other embodiments, the image capture device 105 may provide raw video data or a raw video stream to the computing device 200, and in such embodiments, the saccadic emulator 305 may process the raw video data (e.g., as resizing, rotation, skewing, cropping, and/or the like) for saccadic eye emulation.

In some embodiments, the saccadic emulator 305 may obtain the image data via the I/O interface 240 (not shown) instead of through the communication module 230. In such embodiments a device interface module may obtain the image data from the image capture device 105 via the I/O interface 240, and provide the image data to the saccadic emulator 305 and/or other applications (not shown) for processing. The device interface module may be one or more software modules configured to interact with the various hardware components of the computing device 200. The device interface module and I/O interface 240 may be collectively referred to as "device interface circuitry." In embodiments, the device interface module 505 may control the image capture device 105 via the I/O interface 240 to adjust how the image capture device 105 obtains the image data, such as by performing zoom-in or zoom-out operations and the like. In some embodiments, such a device interface module may convert the received image data into a format that is usable by the saccadic emulator 305 in order for the saccadic emulator 305 to perform the saccadic eye emulation discussed herein.

The saccadic emulator 305 may be one or more software modules that operate in conjunction with one or more hardware devices to obtain the image data and perform a saccadic eye movement emulation to generate a plurality of blocks. Saccadic eye movement may include relatively quick movement of the eyes between at least two points of fixation or focus. The saccadic emulator 305 may emulate saccadic eye movement by focusing on blocks of the subject image where each block has different sample location (spatial location within the subject image). Each block may be the same size or each block may have different sizes. By taking different samples of the image based on the emulated saccadic eye movement, a set of sample data is obtained to enable a statistical technique to extract bio-inspired features for an object. For example, in some embodiments, the saccadic emulator 305 may perform the saccadic eye emulation by starting at a desired reference point within the subject image, and scanning the subject image according to one or more mathematical and/or biological models of saccadic eye movements. The reference point may be chosen randomly or based on the light and/or color intensity. From the scan, the saccadic emulator 305 generates a plurality of blocks based on different spatial locations of the subject image. For example, when an input image is obtained by saccadic emulator 305, saccadic emulator 305 acts like saccadic eye to generate several blocks for an object from which the statistical data can be constructed as shown in equation 1.

$$V = M(U) = [V_1 \ldots V_n] \quad \text{[equation 1]}$$

In equation 1, V is a set of blocks, M is the saccadic emulator 305, U is the input image, $V_i$ is the emulated image or a block from the input image, and n is the total number of samples to be taken by the saccadic emulator 305. Each block is then provided to the vertebrate extraction engine 310 and the fovea extraction engine 315 to obtain vertebrate features and fovea features, respectively.

Vertebrate extraction engine 310 may be one or more software modules that operate in conjunction with one or more hardware devices to perform a Feature Extraction Algorithm (FEA) or a Principal Component Analysis (PCA) algorithm to extract one or more vertebrate features (also referred to as "retina features") from the set of blocks. The FEA or PCA technique maybe chosen according to various empirical studies or design choices. The vertebrate extraction engine 310 emulates retina horizontal cells, which are laterally interconnecting neurons in an inner nuclear layer of the retina of vertebrate eyes that help integrate and regulate the input from multiple photoreceptor cells and also allow vertebrate eyes to adjust to bright and dim light conditions. To emulate the retina horizontal cells, the vertebrate extraction engine 310 may extract low resolution features from the blocks. In this way, the vertebrate features may be representative of low resolution blocks of the one or more blocks obtained from the saccadic emulator 305. In some embodiments, the vertebrate features may be used to scan database images stored in database 125 in a blurry mode to detect objects of interest in the database images. Using FEA and/or PCA along with statistical data set from the saccadic emulator 305, low resolution vertebrate features may be extracted according to equation 2.

$$V_L = FEA(V) \quad \text{[equation 2]}$$

In equation 2, $V_L$ is the low resolution feature, FEA is the FEA or PCA technique, and V is a set of blocks from the saccadic emulator 305. The vertebrate features are then stored in the database 125 for future identification and also provided to the fovea extraction engine 315 for obtaining fovea features.

Fovea extraction engine 315 may be one or more software modules that operate in conjunction with one or more hardware devices to obtain the set of blocks from the saccadic emulator 305 and also obtain the vertebrate features from the vertebrate extraction engine 310, and obtain one or more fovea features from the set of blocks based on the vertebrate features. The fovea extraction engine 315 emulates the fovea region of the eye. The fovea region contains a group of closely packed cones and retinal ganglion cells, and is responsible for sharp central vision (also called foveal vision). In this way, the fovea features may be representative of high resolution blocks of the one or more blocks obtained from the saccadic emulator 305. In some embodiments, the fovea features may be used to confirm potential objects of interest from the retina features and/or the fovea features may be used to detect potential objects of interest. Using the vertebrate features from the vertebrate extraction engine 310, high resolution features may be extracted according to equation 3.

$$V_H = V_C - V_L \quad \text{[equation 3]}$$

In equation 3, $V_C$ is a closest central position of the saccadic position of the eye from the set of blocks V, $V_L$ is the low resolution feature from the vertebrate extraction engine 310, and $V_H$ is the high resolution feature. In some embodiments, the high resolution feature $V_H$ may be obtained by performing a local background suppression operation and a zoom-in operation on the retina features. The fovea features are then stored in the database 125 for future identification and also provided to the LGN engine 320 for obtaining LGN features.

Lateral geniculate nucleus (LGN) engine 320 may be one or more software modules that operate in conjunction with one or more hardware devices to perform another FEA and/or PCA algorithm to extract one or more LGN features from the fovea features provided by the fovea extraction engine 315. The FEA or PCA technique maybe chosen according to various empirical studies or design choices. The LGN engine 320 emulates the LGN of the visual pathway, which is a region in the thalamus that receives information directly from the retinal ganglion cells, parses retinal inputs, and provides time and spatially correlated signals to the visual cortex. In this way, the LGN features may be representative of low resolution features of the one or more fovea features obtained from the fovea extraction engine 315 for comparison with the images stored in the database 125. In various embodiments, the LGN engine 320 may perform a suitable downsampling operation and/or a suitable decimation operation on the fovea features to generate or otherwise obtain the LGN features.

Furthermore, the LGN engine 320 may determine a matching image from images stored in the database 125. In this way, the LGN features may be used to confirm potential objects of interest identified using the retina features and/or the fovea features. In this regard, the LGN engine 320 may obtain a set of the images stored in the database 125, determine regions of interest (ROIs) for potential objects 130 via the communications module 230, and determine a matching image from the set of stored images that includes an object having a greatest maximum correlation with the one or more LGN features from among the set of stored images. For example, an LGN feature $V_{LGN}$ may be defined according to equation 4.

$$V_{LGN}^{i,j} = \sum_{k=1}^{p} \sum_{l=1}^{q} V_H^{(i-1)p+k,(j-1)*q+l} - \frac{1}{MN} \sum_{i=1}^{N} \sum_{j=1}^{M} |V_H^{ij}| \quad \text{[equation 4]}$$

In equation 4, N and M are the height and width of the input image; and p and q are the window row and window column of the retina feature used to obtain the fovea feature. Based on equation 4, the matching image from the set of stored images may be obtained according to equation 5.

$$O = \max(\Sigma_i f(V_{LGN,i}^T \varkappa)) \quad \text{[equation 5]}$$

In equation 5, i=1:n, where n is the number of features to be used for a search, $\varkappa$ is raw data or processed data stored in a database (e.g., database 125), and O is the final output to provide as a match via a linear or non-linear function f, wherein f may be a generic or neural network approximation function.

Once a matching image is obtained from the database 125, the LGN engine 320 may provide the matching image to client device 120 and (optionally) with other image-related information that is stored in association with the matching image.

Figure 4:
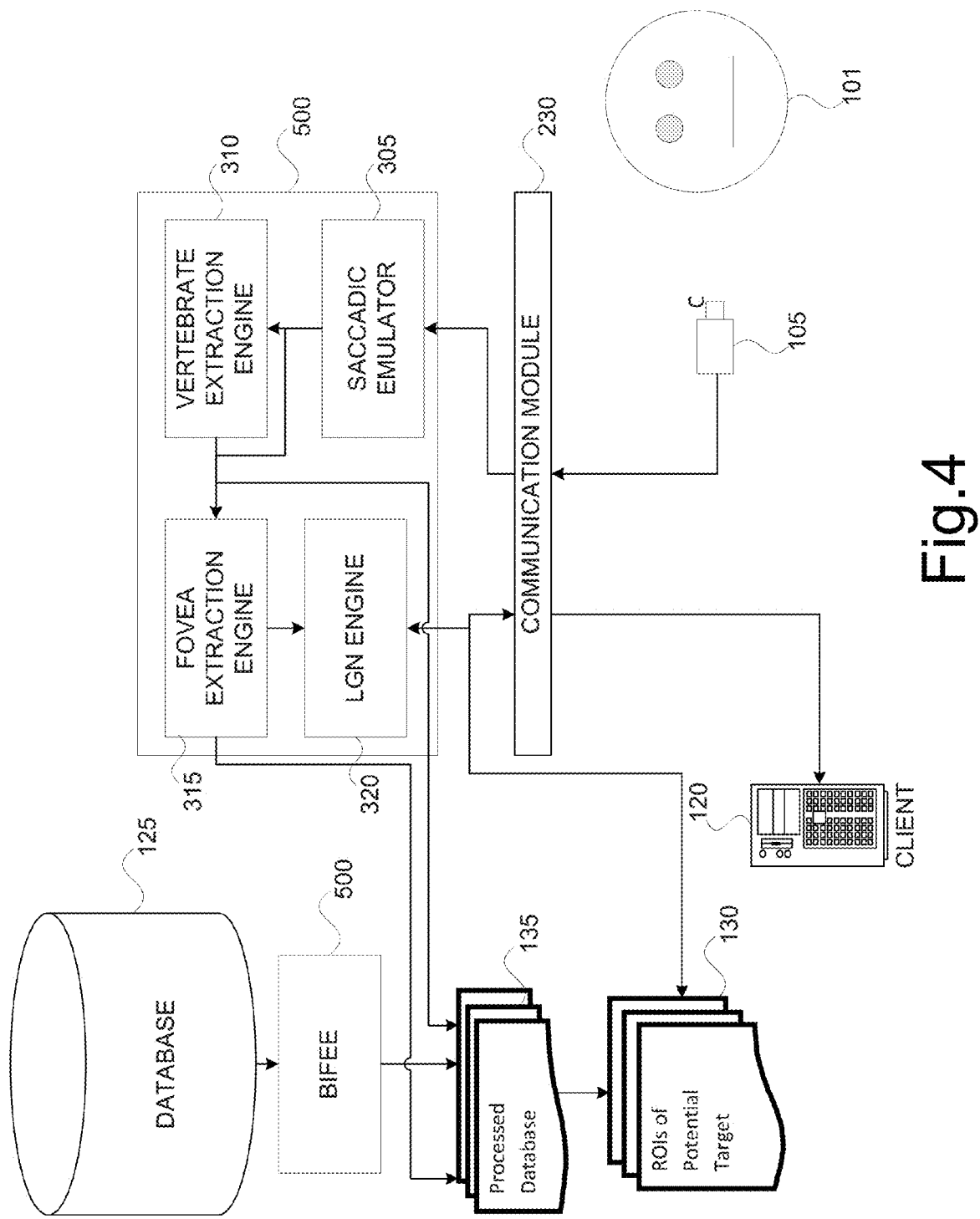
FIG. 4 illustrates example logical components and interaction points of various modules and devices, in accordance with other example embodiments.

FIG. 4 illustrates example logical components and interaction points of the BIFEE 500, in accordance with various other embodiments. For illustrative purposes, the operations of the various modules shown by FIG. 4 will be described as being performed by the computing device 200 as described with respect to FIG. 2. The various modules/devices shown by FIG. 4 may operate in a same or similar fashion as discussed previously with regard to FIG. 3. However, in the embodiments illustrated by FIG. 4, the database 125 may include processed image data instead of raw image data as discussed in the embodiments of FIG. 3. Although FIG. 4 shows logical interactions between various modules and/or devices, according to various embodiments, additional modules may be present and/or the aforementioned modules may be combined or divided into other logical components, or replaced by other devices and/or modules. According to various example embodiments, and with reference to FIGS. 1-2, the computing device 200 including the BIFEE 500 may operate as follows.

Database 125 may store images in association with other information. For example, the database 125 may store images that are obtained from another database of images, such as a database of driver's license photos, a database of images from a social networking service, and/or the like. Such images may be processed using the BIFEE 500 as described herein to obtain one or more vertebrate features, one or more fovea features, and one or more LGN features from such images. In embodiments, at least some of the images stored in the database 125 may be "partial images" wherein a potential target object is cutoff or obscured in the image by noise or other objects in the image. Furthermore, the database 125 may also store other image-related information if known. For example, in embodiments where the images stored in the database 125 are processed images obtained from another database, the image-related information may include personal identification information, demographic information, time stamp of the image, geolocation information associated with the image, and/or other like information.

Once the processed image data is further processed using the BIFEE 500, a database 135 of processed images may be generated. The processed database 135 may store the one or more vertebrate features, the one or more fovea features, and the one or more LGN features in association with each image. These vertebrate features, fovea features, and LGN features may be used to determine the ROIs of potential targets 130, which are then used for comparison with the LGN features obtained for a captured image as discussed with regard to FIG. 3.

Figure 5:
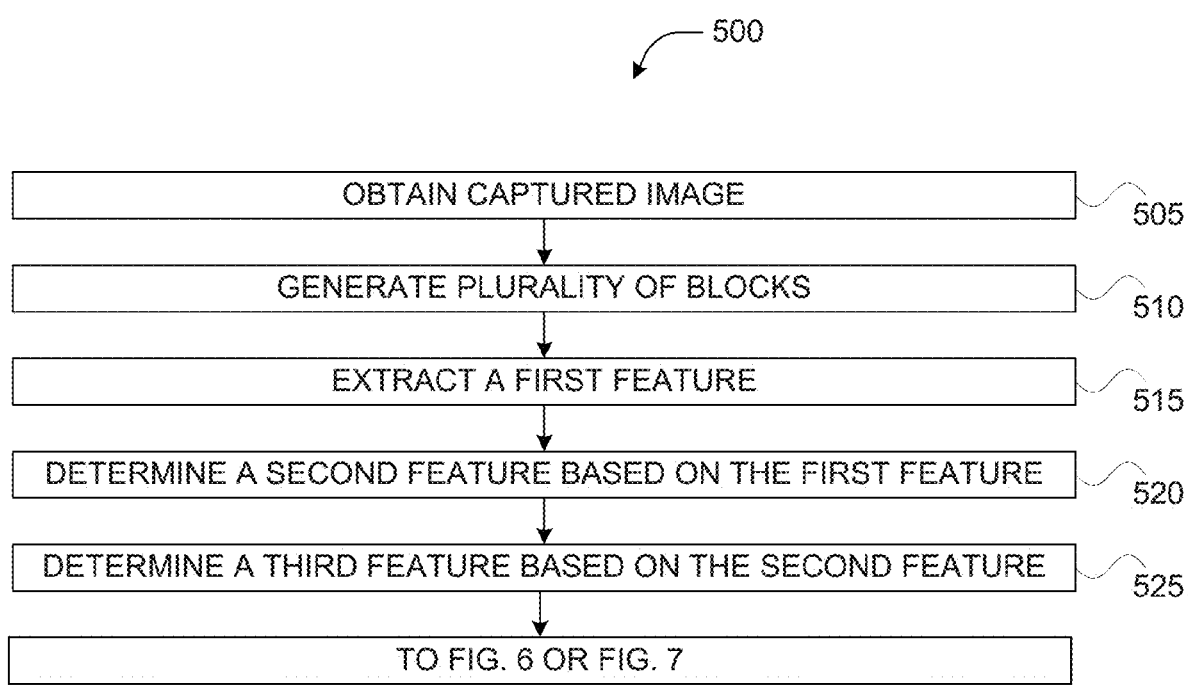
FIGS. 5-7 illustrate example processes for a bio-inspired feature extraction engine (BIFEE) application, in accordance with various embodiments.
Figure 6:
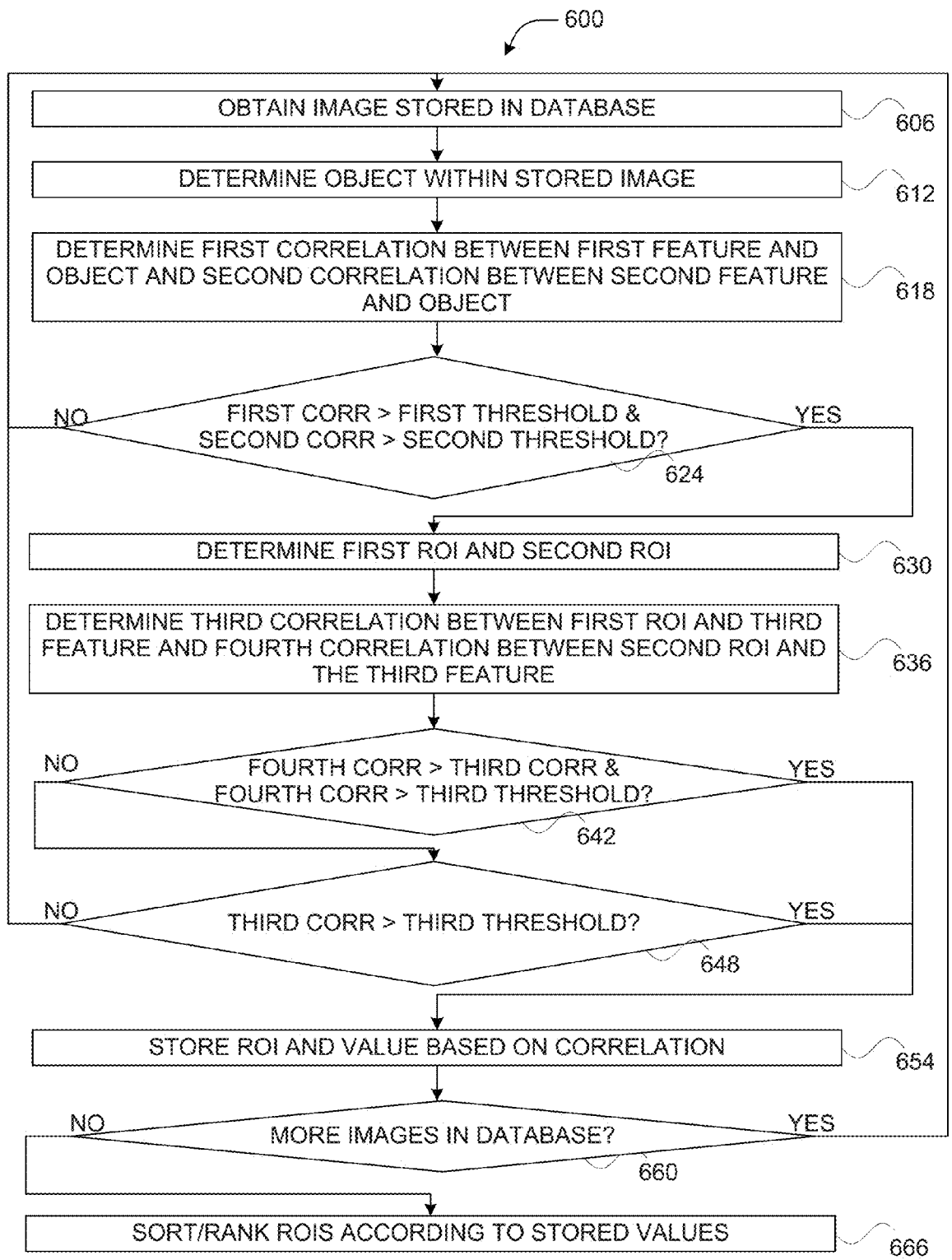
Figure 7:
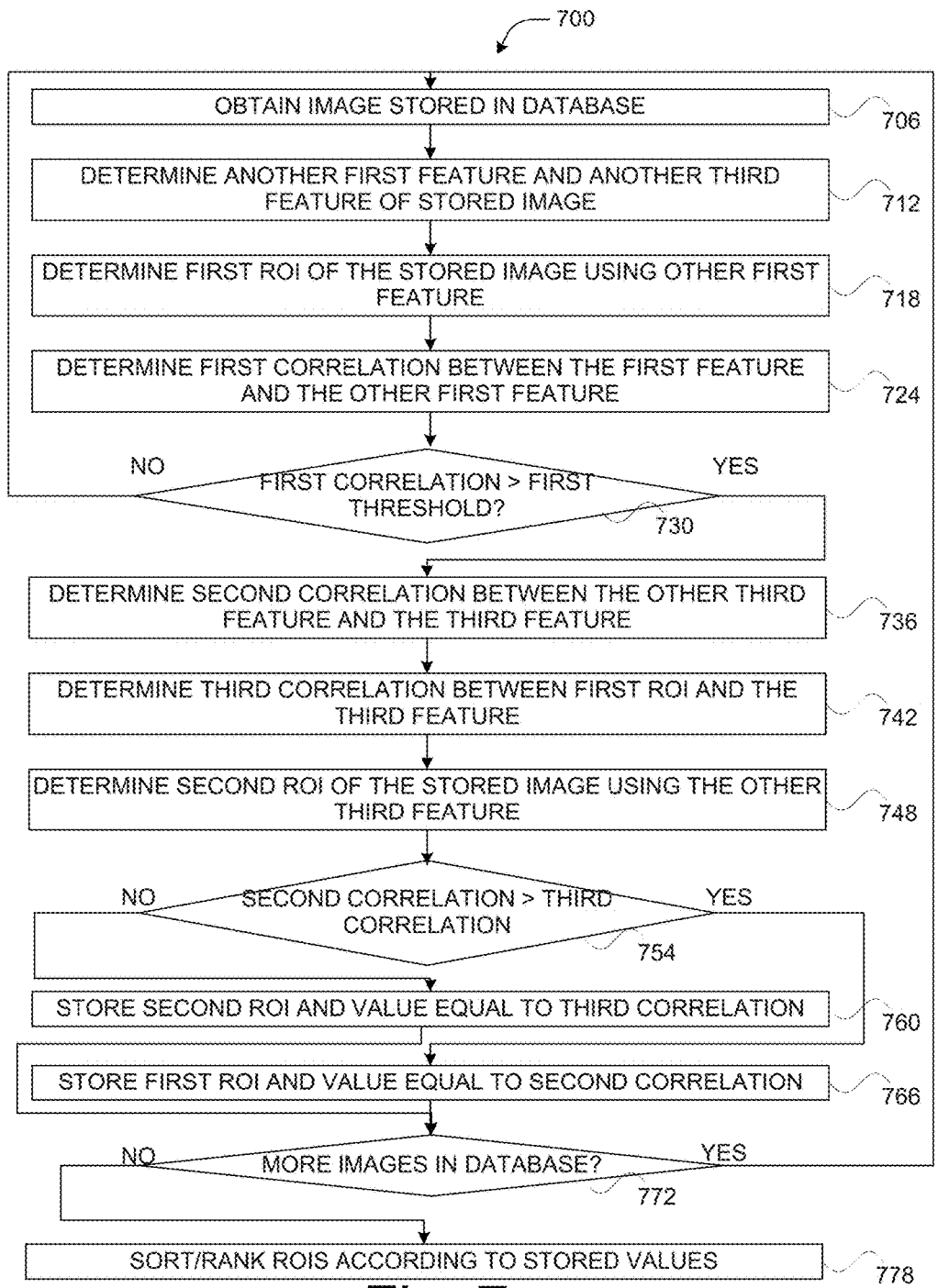

FIGS. 5-7 show flowcharts illustrating an example processes 500-700 of the BIFEE 500, in accordance with various embodiments. According to various embodiments, the processes 500 and 600 of FIGS. 5-6 may be used for processing raw image data as discussed with regard to FIG. 3, while the processes 500 and 700 of FIGS. 5 and 7 may be used for processing processed image data. For illustrative purposes, the operations of process 500 will be described as being performed by the computing device 200 utilizing the various components and modules, as described with respect to FIGS. 3-4. However, it should be noted that other similar devices may operate the process 500-700 as described below. While particular examples and orders of operations are illustrated in FIGS. 5-7, in various embodiments, these operations may be re-ordered, broken into additional operations, combined, and/or omitted altogether.

Referring to FIG. 5, process 500 may start at operation 505, where the computing device 200 may obtain image data of a captured image from an image capture device 105. At operation 510, the computing device 200 may obtain a plurality of blocks from the image data. In embodiments, the saccadic emulator 305 of the BIFEE 500 may perform a saccadic eye movement emulation to generate the plurality of blocks. At operation 515, the computing device may extract a first feature from some or all of the plurality of blocks. The computing device 200 may to obtain the first feature. In embodiments, the vertebrate extraction engine 310 of the BIFEE 500 may obtain one or more vertebrate features as the first feature using an FEA or PCA algorithm.

In various embodiments, a Dominant-Based PCA (DPCA) may be used, which may include using a dominant-element-based gradient descent and dynamic initial learning rate technique. In such embodiments, a stochastic sequential adaptive learning algorithm is selected and using an objective (energy) function shown by equation 6.

$$J(w) = \sum_{i=1}^{m} \Psi_i = \sum_{i=1}^{m} \sum_{t=1}^{k} |x_t - w_i w_i^T x_t|^2 \quad \text{[equation 6]}$$

In equation 6, m is the number of principal components, k is the number of measurement vectors, $x_t$ is a measured vector at time t and $w_i$ is the $i^{th}$ principal vector (or eigenvector). With $$J_i(w_i) = \sum_{t=1}^{k} |y_i^t - w_i w_i^T y_i^t|^2 \quad \text{[equation 7]}$$

and $$y_i^t = x_t - \sum_{j=1}^{i-1} w_j w_j^T x_t$$

From equation 7, the learning algorithm can be processed sequentially for each principal vector that is based on gradient descent according to equation 8.

$$\Delta w_{ij} = -\frac{\partial \Psi_i}{\partial w_{ij}} = -\frac{\partial (|y_i^t - w_i w_i^T y_i^t|^2)}{\partial w_{ij}} \quad \text{[equation 8]}$$

From equation 8, and when only a dominant element is used, an update of weights can be obtained according to equation 9. y is an objective function which consists of remained (in-extracted) components after removing the previous extracted components. $\zeta = \zeta(i,j)$ is learning rate.

$$w_{ij}^{new} = w_{ij}^{old} + \zeta \Delta w_{ij} = w_{ij}^{old} + \zeta \varepsilon_{ij}(w_i^T y_i^t + w_{ij} y_{ij}^t) \quad \text{[equation 9]}$$

where $$\zeta(i, j) = \frac{E_0}{E_{i-1}} \text{ and } \hat{y}_i^t = w_i^T y_i^t,$$

$E_0$ is the initial energy when the network starts learning and $E_{i-1}$ is the energy of the $(i-1)^{th}$ extracted principal vector.

At operation 520, the computing device 200 may determine a second feature based on the first feature. In various embodiments, the second feature may include one or more fovea features. In embodiments where saccadic eye movement emulation is used, the second feature may be determined based on the first feature and a block of the plurality of blocks that is a closest central position of the saccadic eye movement emulation. In some embodiments, the computing device 200 may perform a local background suppression operation and zoom-in operation on the first feature to determine the second feature.

At operation 525, the computing device 200 may determine a third feature based on the second feature. In various embodiments, the third feature may include one or more LGN features. In embodiments, perform a downsampling operation and/or a decimation operation on the second feature to generate or determine the third feature.

Once the third feature is determined, the computing device 200 may proceed to FIG. 6 for determining a matching image from a database 125 storing raw image data, or the computing device 200 may proceed to FIG. 7 for determining a matching image from a database 125 storing processed image data.

Referring to FIG. 6, at operation 606, the computing device 200 may obtain an image stored in the database 125. At operation 612, the computing device 200 may determine an object within the image obtained at operation 606. In embodiments, an FEA, a PCA, or any other suitable algorithm may be used to determine the object. At operation 618, the computing device 200 may determine a first correlation between the first feature obtained at operation 515 and the object and the computing device 200 may determine a second correlation between the second feature obtained at operation 520 and the object. For example, the first and second correlations may be determined using equations 10 and 11, respectively.

$$c_1 = \text{corr}(V_L^T, D_s^i) \quad \text{[equation 10]}$$

$$c_2 = \text{corr}(V_H^T, D_s^i) \quad \text{[equation 11]}$$

In equation 10, $C_1$ is the first correlation, corr is any suitable correlation function that yields a value indicative of a strength of association between two or more variables, $V_L$ is the first feature (e.g., the vertebrate feature) obtained at operation 515, and Ds is the object detected in the stored image. In equation 11, $C_2$ is the second correlation, corr is the same or similar correlation function used in equation 10, $V_H$ is the second feature (e.g., the fovea feature) obtained at operation 520, and Ds is the object detected in the stored image.

At operation 624, the computing device 200 may determine whether the first correlation is greater than a first threshold and whether the second correlation is greater than a second threshold. The first threshold and the second threshold may be chosen according to various design choices or empirical studies. If at operation 624, the computing device 200 determines that the first correlation is not greater than the first threshold and/or that the second correlation is not greater than the second threshold, then the computing device 200 may proceed to operation 606 to obtain the next stored image. If at operation 624, the computing device 200 determines that the first correlation is greater than the first threshold and that the second correlation is greater than the second threshold, then the computing device 200 may proceed to operation 630 to determine a first ROI and a second ROI associated with the object.

At operation 630, the computing device 200 may determine a first ROI and a second ROI associated with the object. The first ROI and/or the second ROI may be a subset of samples used to determine the object, such as a polygon or borders surrounding the object. At operation 636, the computing device 200 may determine a third correlation between the first ROI and the third feature (e.g., the LGN feature) obtained at operation 525 and the computing device 200 may determine a fourth correlation between the second ROI and the third feature (e.g., the LGN feature) obtained at operation 525. In some embodiments, the third and fourth correlations may be maximum correlations. For example, the third and fourth correlations may be determined using equations 12 and 13, respectively.

$$c_3 = \max \text{corr}(ROI_1, V_{LGN}) \quad \text{[equation 12]}$$

$$c_4 = \max \text{corr}(ROI_2, V_{LGN}) \quad \text{[equation 13]}$$

In equation 12, $C_3$ is the third correlation, max corr is any suitable correlation function that yields a value indicative of a maximum or greatest correlation between two or more variables, $V_{LGN}$ is the third feature (e.g., the LGN feature) obtained at operation 525, and $ROI_1$ is the first ROI. In equation 13, $C_4$ is the fourth correlation, max corr is the same or similar maximum correlation function used in equation 12, $V_{LGN}$ is the third feature (e.g., the LGN feature) obtained at operation 525, and $ROI_2$ is the second ROI.

At operation 642, the computing device 200 may determine whether the fourth correlation is greater than the third correlation and whether the fourth correlation is greater than a third threshold. The third threshold may be chosen according to various design choices or empirical studies. If at operation 642, the computing device 200 determines that the fourth correlation is greater than the third correlation and that the fourth correlation is greater than the third threshold, then the computing device 200 may proceed to operation 654 to store a value equal to the fourth correlation in association with the first ROI.

If at operation 642, the computing device 200 determines that the fourth correlation is not greater than the fourth threshold and/or that the fourth correlation is not greater than the third threshold, then the computing device 200 may proceed to operation 648 to determine whether the third correlation is greater than the third threshold.

At operation 648, the computing device 200 may determine whether the third correlation is greater than the third threshold. If at operation 648, the computing device 200 determines that the third correlation is not greater than the third threshold, then the computing device 200 may proceed to operation 606 to obtain a next stored image. If at operation 648, the computing device 200 determines that the third correlation is greater than the third threshold, then the computing device 200 may proceed to operation 654 to store a value equal to the third correlation in association with the second ROI.

At operation 660, the computing device 200 may determine whether there are any more stored images to be processed, and if so, the computing device 200 may proceed to operation 606 to obtain a next stored image. Otherwise, the computing device 200 may proceed to operation 666 to sort and/or rank the ROIs according to their associated values, which may be the values stored for each image at operation 654.

Referring back to FIG. 5, once the third feature is determined at operation 525, the computing device 200 may proceed to FIG. 7 for determining a matching image from a database 125 storing processed image data.

Referring to FIG. 7, at operation 706, the computing device 200 may obtain an image stored in the database 125. At operation 712, the computing device 200 may determine another first feature and another third feature of the image obtained at operation 706. The other first feature may be a vertebrate feature of the stored image and the other third feature may be an LGN feature of the stored image, which may be extracted from the stored image in a same or similar manner as discussed previously with regard to the vertebrate and LGN features. At operation 718, the computing device 200 may determine a first ROI of the stored image using the other first feature. In some embodiments, the first ROI may be a boundary or polygon surrounding the other first feature.

At operation 724, the computing device 200 may determine a first correlation between the first feature determined at operation 515 and the other first feature. For example, the first correlation may be determined using equation 14.

$$c_1 = \text{corr}(V_L^T, D_{EL}^i) \quad \text{[equation 14]}$$

In equation 14, $C_1$ is the first correlation, corr is any suitable correlation function that yields a value indicative of a strength of association between two or more variables, $V_L$ is the first feature (e.g., the vertebrate feature) obtained at operation 515, and $D_{EL}$ is the other first feature of the stored image.

At operation 730, the computing device 200 may determine whether the first correlation is greater than the first threshold. The first threshold may be chosen according to various design choices or empirical studies. If at operation 730, the computing device 200 determines that the first correlation is not greater than the first threshold, then the computing device 200 may proceed to operation 706 to obtain the next stored image. If at operation 730, the computing device 200 determines that the first correlation is greater than the first threshold, then the computing device 200 may proceed to operation 736 to determine a second correlation between the third feature determined at operation 525 and the other third feature determined at operation 712.

At operation 736, the computing device 200 determine a second correlation between the third feature determined at operation 525 and the other third feature determined at operation 712. In some embodiments, the second correlation may be a maximum correlation. For example, the second correlation may be obtained using equation 15.

$$c_2 = \max \text{corr}(D_{ELGN}, V_{LGN}) \quad \text{[equation 15]}$$

In equation 15, $C_2$ is the second correlation, max corr is any suitable correlation function that yields a value indicative of a maximum or greatest correlation between two or more variables, $V_{LGN}$ is the third feature (e.g., the LGN feature) obtained at operation 525, and $D_{ELGN}$ is the other third feature determined at operation 712.

At operation 742, the computing device 200 may determine a third correlation between the first ROI and the third feature (e.g., the LGN feature) obtained at operation 525. In some embodiments, the third correlation may be a maximum correlation. For example, the third correlation may be determined using equation 16.

$$c_3 = \max \text{corr}(ROI_1, V_{LGN}) \quad \text{[equation 16]}$$

In equation 16, $C_3$ is the third correlation, max corr is any suitable correlation function that yields a value indicative of a maximum or greatest correlation between two or more variables, $V_{LGN}$ is the third feature (e.g., the LGN feature) obtained at operation 525, and $ROI_1$ is the first ROI.

At operation 748, the computing device 200 may determine a second ROI of the stored image using the other third feature. In some embodiments, the second ROI may be a boundary or polygon surrounding the other third feature.

At operation 754, the computing device 200 may determine whether the second correlation is greater than the third correlation. If at operation 754, the computing device 200 determines that the third correlation is greater than the third correlation, then the computing device 200 may proceed to operatio 766 to store a first value equal to the second correlation in association with the first ROI. If at operation 754, the computing device 200 determines that the third correlation is not greater than the third correlation, then the computing device 200 may proceed to operation 760 to store a second value equal to the third correlation in association with the second ROI.

From operation 760 or 766, the computing device 200 may proceed to operation 772 to determine whether there are any more stored images to be processed, and if so, the computing device 200 may proceed to operation 706 to obtain a next stored image. Otherwise, the computing device 200 may proceed to operation 778 to sort and/or rank the ROIs according to their associated values, which may be the values stored for each image at operation 760 and/or operation 766.

Figure 8:
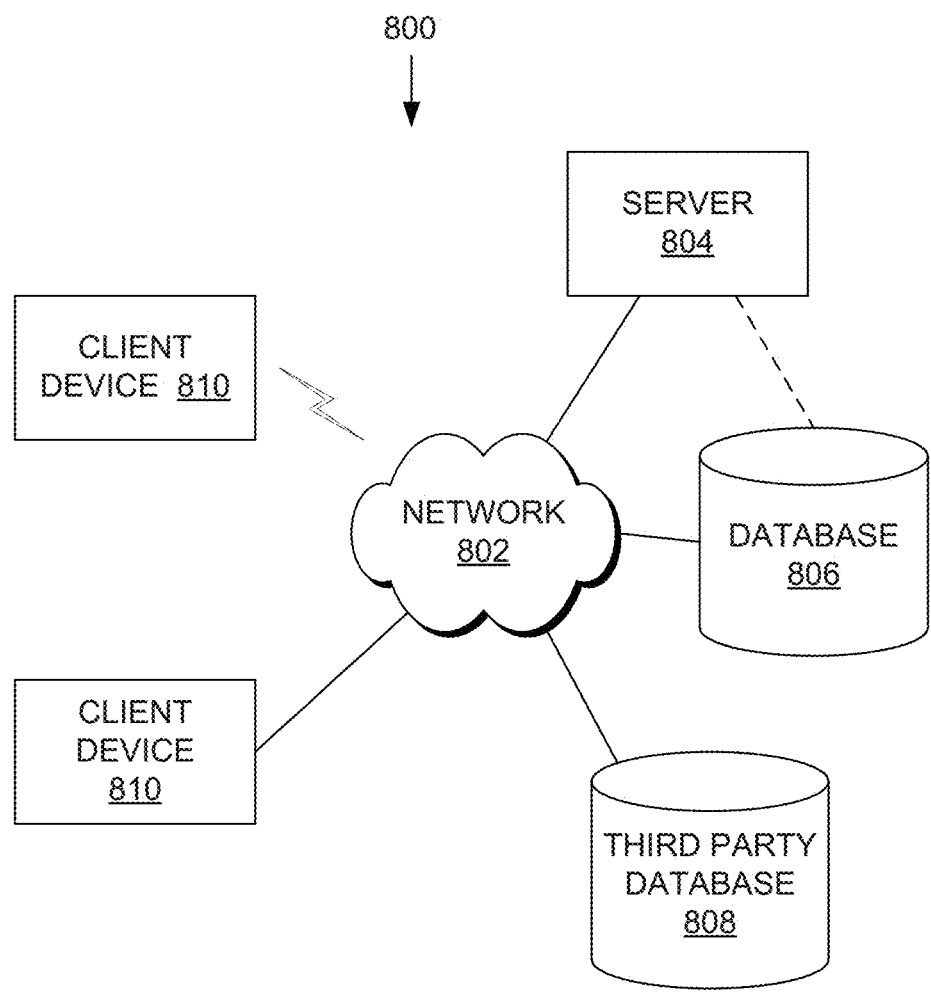
FIG. 8 illustrates an alternative example arrangement in which example embodiments described in the present disclosure may be implemented.

FIG. 8 illustrates an example arrangement 800 according to an alternative embodiment. Arrangement 800 includes a network 802, a server 804, a database 806, a third party database 808, and client devices 810. Each of the server 804, database 806, third party database 808, and client devices 810 is in communication with the network 802.

Network 802 comprises a wired and/or wireless communications network, such as similar to network 110. When the network 802 comprises a public network, security features (e.g., VPN/SSL secure transport) may be included to ensure authorized access within the arrangement 800. Although not shown, the network 802 can include, without limitation, servers, databases, switches, routers, base stations, repeaters, software, firmware, intermediating servers, and/or other components to facilitate communication between devices in arrangement 800. The network 802 may comprise one or more networks, for example, a cellular network in communication with the Internet.

Server 804 comprises one or more computers, processors, or servers to perform BIFEE and integration search functionalities as described herein. Without limitation, server 804 may be similar to server 115. Server 804 communicates with database 806 (directly or indirectly via network 802), third party database 808, and/or client devices 810 via the network 802. Server 804 hosts one or more applications accessed by the client devices 810; hosts one or more websites accessed by the client devices 810; provides processing functionalities for the client devices 810; provides data, templates, web pages, etc. to the client devices 810; performs computations to generate different scaled images as described in detail below; performs searches to identify matching (or best matching) object images based on a plurality of image inputs; and/or facilitates access to and/or store information in the databases 806, 808. In some embodiments, server 804 includes one or more web servers, one or more application servers, one or more servers providing user interface (UI) or graphical user interface (GUI) functionalities in connection with implementation of integration search functionalities, and the like.

Database 806 comprises one or more storage devices configured to store data and/or instructions for use by client devices 810 and/or server 802. The content of database 806 is accessed via the network 802 and/or directly by the server 804. The content of database 806 may be arranged in a structured format to facilitate selective retrieval. In some embodiments, database 806 is similar to database 125 and contains at least similar content as in database 125. The content of database 806 includes, without limitation, a plurality of images and/or video, associated image and/or video information, extracted images and/or video, associated extracted image and/or video information, and the like. In some embodiments, database 806 may comprise more than one database, a first database including a plurality of images and/or video and a second database (also referred to as an extracted database) including a plurality of extracted images and/or video generated from the plurality of images and/or video in the first database.

Third party database 808 comprises one or more storage devices configured to store data and/or instructions for use by client devices 810 and/or server 802. The content of database 808 is accessed via the network 802. The content of database 808 may be arranged in a structured format to facilitate selective retrieval. Database 808 may contain, for example, product information (e.g., images and/or video of products or objects) maintained by manufacturers, retailers, distributors, websites, or other third parties knowledgeable about products or objects that may be offered for sale. In other embodiments, content of database 808 may be maintained by the same entity that maintains database 806.

Client devices 810 comprise a wired and/or wireless communication computing device in communication with the network 802. Each of the client devices 810 is similar to client device 120. In some embodiments, each of the client devices 810 includes, without limitation, an input sensor (e.g., camera, bar code reader, machine readable information reader, physical keyboard, virtual keyboard provided using software on a touch screen), transceiver, storage unit, display (e.g., touch screen), one or more input mechanisms (e.g., keyboard, trackball, trackpad, touch screen), and a processor. The processor is in communication with and configured to coordinate control of each of the input sensor, transceiver, storage unit, display, and input mechanisms. Client devices 810 can be geographically distributed from each other and/or the network 802. Although two client devices 810 are shown in FIG. 8, more or less than two client devices can be included in the arrangement 800.

Each of the client devices 810 further includes one or more applications (also referred to as "apps") such as, but not limited to, a web browser, messaging application, electronic mail (email) application, product search application, object recognition or recommendation application, one or more apps acquired from an application store or library, and interface and communication capabilities to communicate with one or more components within the arrangement 800.

Although a single server 804, database 806, and database 808 is shown in FIG. 8, each of server 804 and databases 806, 808 can comprise two or more devices and/or may be located at one or more geographically distributed locations from each other. Alternatively, database 806 and/or 808 may be included within server 804. As another alternative, a database server may be included in arrangement 800 to facilitate retrieval, storage, and management of data maintained within database 806 and/or 808. Further, while arrangement 800 shown in FIG. 8 employs a client-server architecture, embodiments of the present disclosure is not limited to such an architecture, and may equally well find application in, for example, a distributed or peer-to-peer architecture system.

Figure 9:
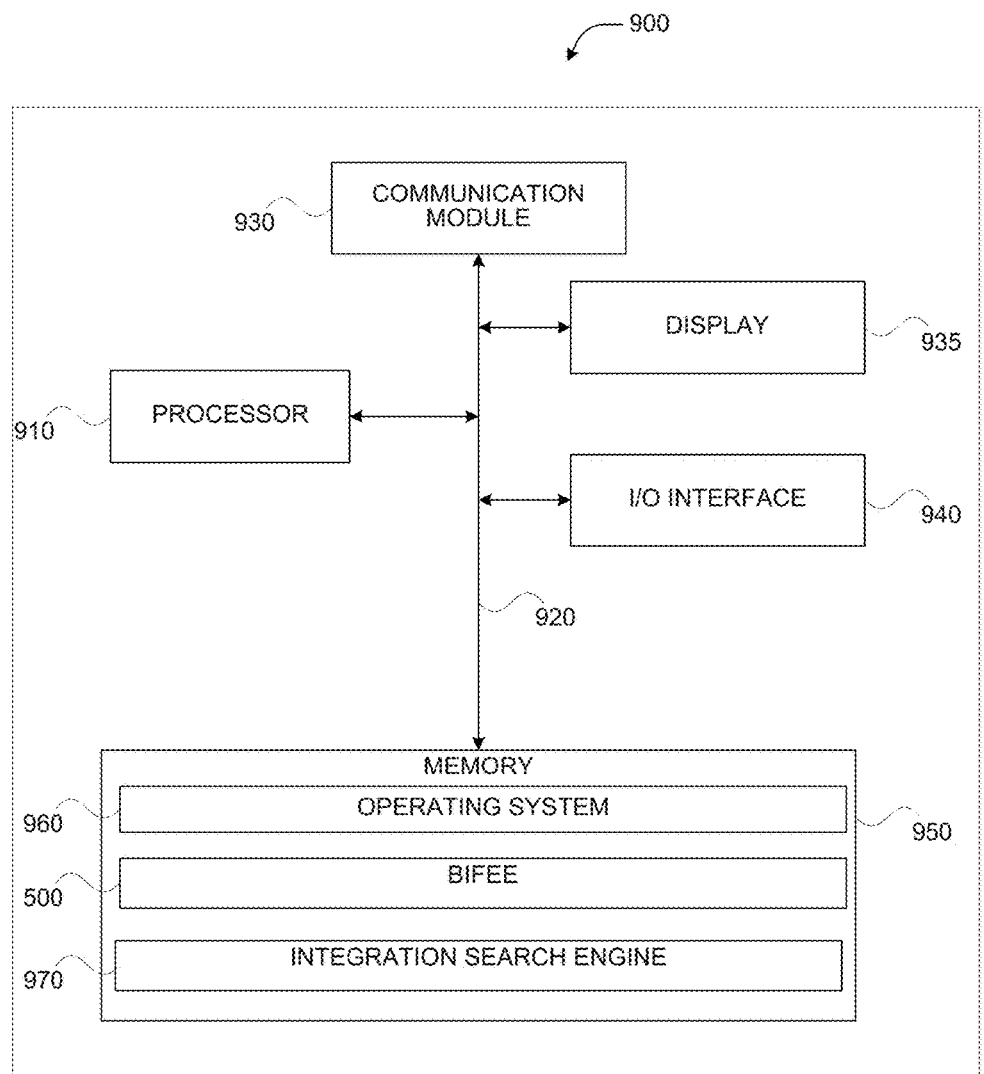
FIG. 9 illustrates components of a computing device, in accordance with additional embodiments.

FIG. 9 illustrates components of a computing device 900, in accordance with another embodiment. Computing device 900 comprises the server 804, database 806, third party database 808, and/or client devices 810. Computing device 900 may include processor 910, memory 950, bus 920, communications module 930, input/output (I/O) interface 940, and display 935. In some embodiments, computing device 900 may include many more components than those shown in FIG. 9, such as an input device (e.g., a physical keyboard, a touch screen, etc.), and other like components.

However, it is not necessary that all of these generally conventional components be shown in order to disclose the example embodiments.

Processor 910, memory 950, bus 920, communications module 930, input/output (I/O) interface 940, and display 935 are similar respectively to processor 210, memory 250, bus 220, communications module 230, input/output (I/O) interface 240, and display 235 shown in FIG. 2.

Memory 950, in addition to including an operating system 960 and BIFEE 500, also includes program code for one or more software components, such as an integration search engine 970. Operating system 960 may manage computer hardware and software resources and provide common services for computer programs. Operating system 960 may include one or more drivers that provide an interface to hardware devices thereby enabling operating system 960, BIFEE 500, integration search engine 970, and other software components to access hardware functions without needing to know the details of the hardware itself. The operating system 960 may be a general purpose operating system or an operating system specifically written for and tailored to the computing device 900. Each of BIFEE 500 and the integration search engine 970 may be a collection of software modules and/or program code that enables the computing device 900 to operate according to the various example embodiments as discussed herein.

In some embodiments, computing device 900 includes modules, software components, program code, and/or applications to cause (through hardware, firmware, and/or software) to obtain a source signal, image data, and/or video data (referred to generally as a "captured image"), generate a plurality of blocks from the captured image, wherein each block of the plurality of blocks is representative of a corresponding region of the captured image; extract a first feature (such as a vertebrate or retina feature) from at least one block of the plurality of blocks; determine a second feature (such as a fovea feature) based at least on the first feature; determine a third feature (such as an LGN feature) based on the second feature; determine, as a matching image (also referred to as a potential target or region of interest (ROI) of a potential target image), one or more stored images from among a plurality of stored images includes an object that has greatest maximum correlation with the third feature; and perform various other functions according to the example embodiments disclosed herein.

The various modules may comprise BIFEE 500, which facilitates processes 500, 600, and 700 (described with regard to FIGS. 5, 6, and 7, respectively). The various modules may be loaded into memory 950 and executed by the processor 910. Once the various modules are loaded into memory 950 and executed by the processor 910, the processor 910 may be configured to perform the processes 500, 600, and/or 700 as discussed with regard to FIGS. 5-7.

The captured image may comprise an image or video stored in database 806 or 808 from which extracted first, second, and third features are generated. When a plurality of images and/or videos are stored in database 806 or 808, each image and/or video (also referred to as an original image and/or video) of the plurality of images may be processed to generate a respective set of extracted first, second, and third features and appropriately stored in database 806 (e.g., within an "extracted database" portion). As discussed in greater detail below, each original image and/or video may have more than one corresponding set of extracted first, second, and third features. Each set of features of a given original image and/or video associated with a different scaling factor from each other. The integration search engine 970 facilitates populating the "extracted database" in conjunction with BIFEE 500.

In other embodiments, the captured image may comprise an image or video of a full or complete object, a part or portion of an object, a full or complete face, or a part or portion of a face that is provided as a search input. Such search input may be similarly processed by BIFEE 500 to generate more than one set of extracted first, second, and third features, each set associated with a different scaling factor from each other. The integration search engine 970 is similarly involved with BIFEE 500 to generate these sets of data.

In some embodiments, when inputs to an object search request comprises a plurality of search inputs (e.g., two or more search inputs that are images and/or video), computing device 900 further includes modules, software components, program code, and/or applications to cause (through hardware, firmware, and/or software) to determine which image(s) or video(s) associated with the ROIs of potential target images has the greatest maximum correlation with the combination of plurality of search inputs for the object search request; and perform various other functions according to the example embodiments disclosed herein. The plurality of search inputs may be disparate from each other. For example, one or more search inputs of the plurality of search inputs may be at a different scale from each other, have an overlapping region with each other, not have an overlapping region with each other, and the like. The integration search engine 970 is capable of finding matching images(s)/video(s) based on even a set of disparate or non-normalized set of search inputs.

While specific modules are described herein, it should be recognized that, in various embodiments, various modules and/or processes may be combined, separated into separate modules and/or processes, and/or omitted. Additionally, in various embodiments, one or more modules and/or processes may be implemented on separate devices, in separate locations, or distributed, individually or in sets, across multiple processors, devices, locations, and/or in cloud-computing implementations.

In some embodiments, the mechanism to determine extracted features (first feature, second feature, and third feature) for a given image/video and determine best matching ROIs of potential matching images/video in a database for the given image/video can be leveraged to facilitate image/video searching based on image/video query or search inputs. The image/video query or search inputs for a given query or search request can comprise (1) one or more images/videos, (2) scaling factor of the object depicted in one or more of the inputs may be unknown, (3) images/videos stored in a database against which the search will be performed may have different scaling factors from each other and/or the scaling factors of the stored images/videos are unknown, and/or (4) each of the image/video query or search inputs may depict a full or portion of an object. Even with such uncertainty, embodiments of the present disclosure is capable of accurately determining matching (or closest matching) images/videos stored in a database as the query or search results.

Even though embodiments of the present disclosure applies to images and video, the description herein will use "image" or "images" to refer to images, videos, and/or both for ease of describing the present disclosure. The terms "resolution," "scaling," "scaling factor," "scaling size," "scaling resolution," and the like are used interchangeably herein, referring to pixel size as opposed to the number of pixels. For example, a low resolution image and a high resolution image may each contain the same number of pixels; however, the pixels in the low resolution image are larger size than pixels in the high resolution image. Hence, the low resolution image tends to be blurry in comparison to the high resolution image.

Figure 10A:
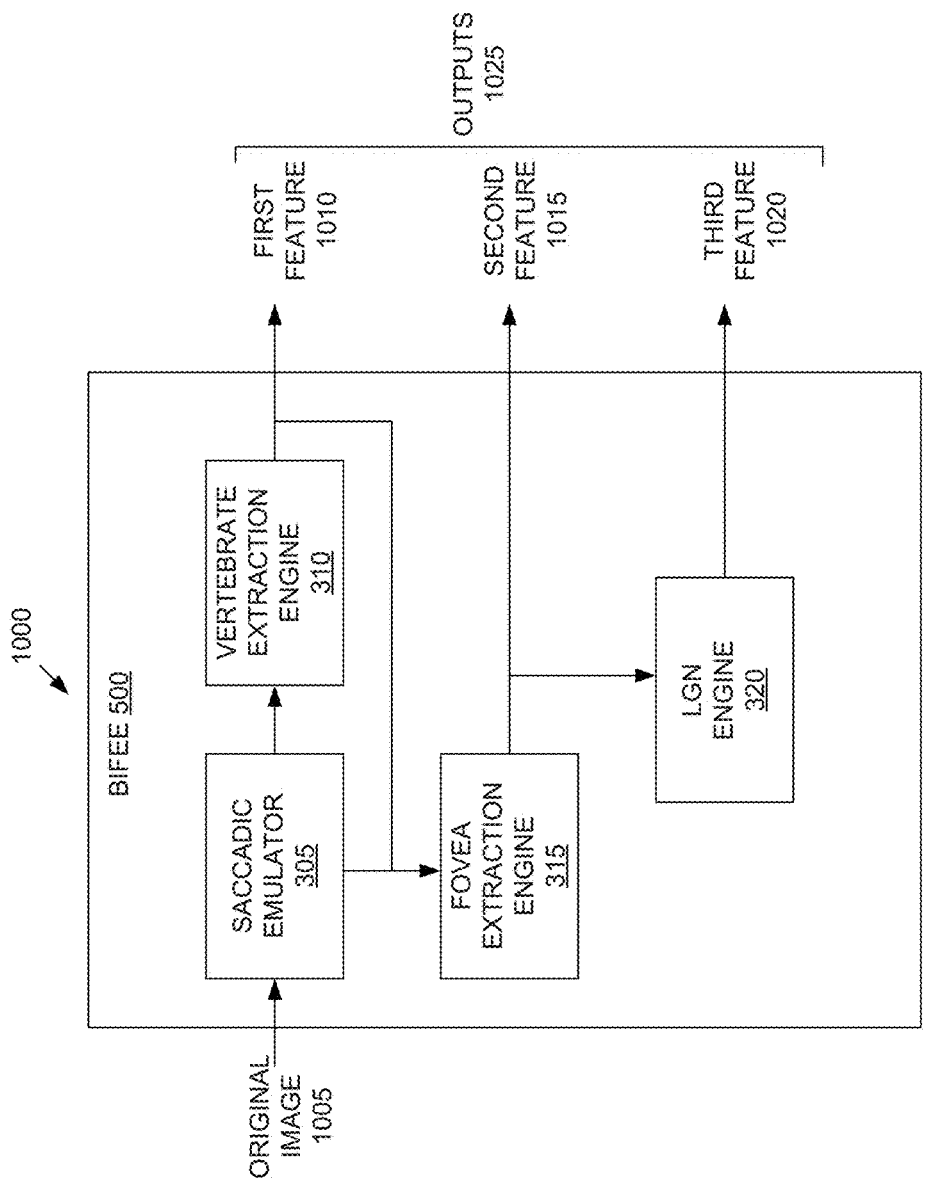
FIG. 10A illustrates an example block diagram providing an overview of the input and outputs of the BIFEE, according to some embodiments.
Figure 10B:
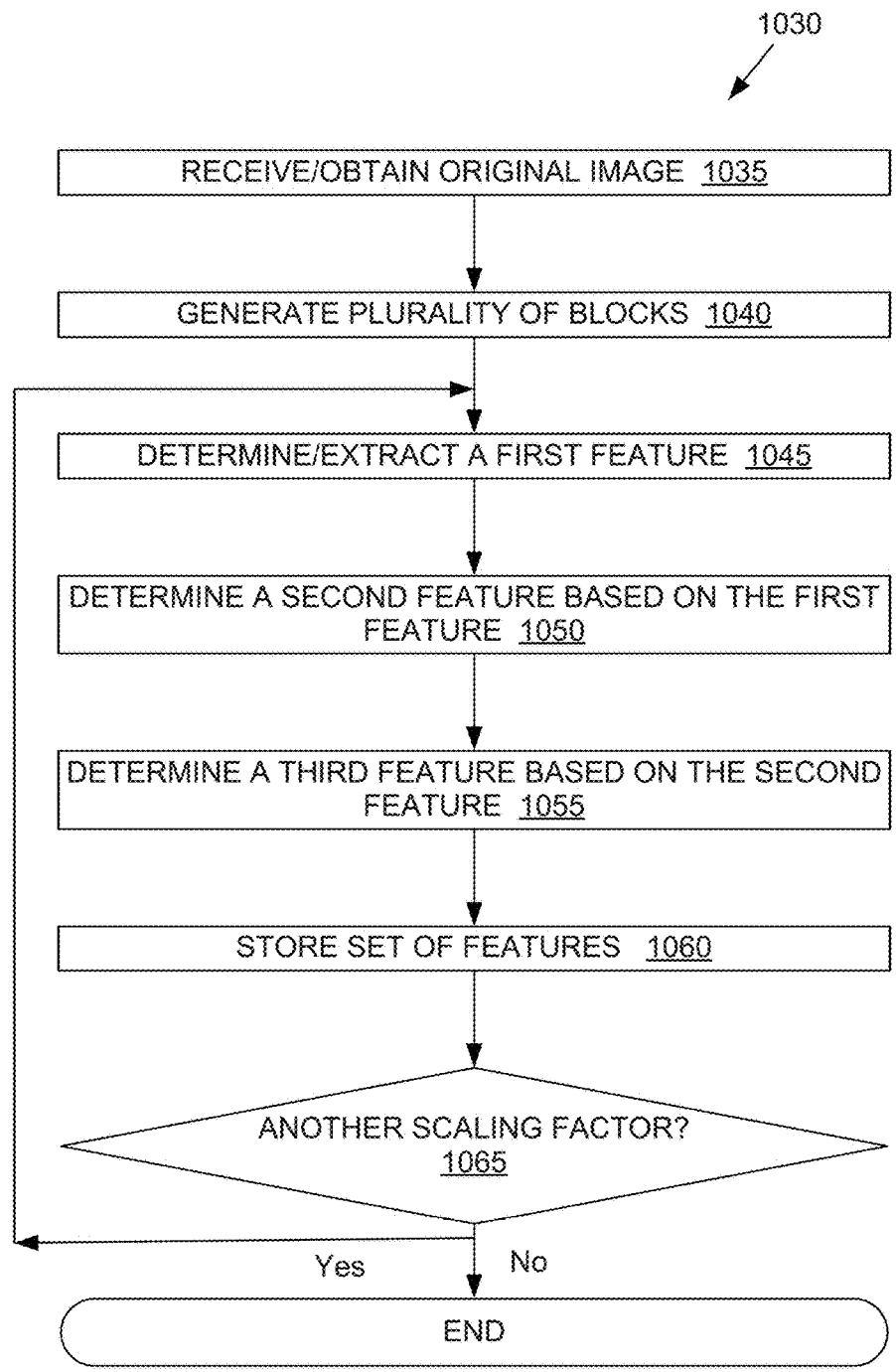
FIG. 10B illustrates an example process for generating the outputs of the BIFEE, according to some embodiments.

Recall the extraction or decomposition functionality of BIFEE 500. FIG. 10A illustrates an example block diagram 1000 that provides an overview of the input and outputs of the BIFEE 500, according to some embodiments. The input and outputs are similar to those discussed above in connection with FIGS. 3-5. FIG. 10B illustrates an example process 10300 for generating the outputs of the BIFEE 500, according to some embodiments. Process 1030 is similar to process 500 of FIG. 5.

As shown in FIG. 10A, the input to BIFEE 500 is an original image 1005 (also referred to as a starting image, captured image, or raw image). As will be described in detail below, original image 1005 may comprise any image, such as an image depicting a full or whole object, an image depicting a part or portion of an object, an image depicting an object at any scaling factor (known or unknown), a query or search input, a stored image in a database, or any other image desirous of being processed by BIFEE 500. The object depicted in the original image 1005 can comprise any object, product, good, face, person, tangible item, animate item, inanimate item, biologic item, non-biologic item, and the like.

Original image 1005 is processed by the BIFEE 500 to generate a set of outputs 1025. Outputs 1025 comprise various decomposed or extracted data from the original image 1005. Such decomposed or extracted data may be considered to be separate images or features based on the original image 1005. Outputs 1025 comprise a first feature 1010 (also referred to as a vertebrate feature, retina feature, or $V_L$), a second feature 1015 (also referred to as a fovea feature or $V_H$), and a third feature 1020 (also referred to as a LGN feature or $V_{LGN}$). Additional details about the first, second, and third features 1010, 1015, 1020 are provided above.

As shown in FIG. 10A and as discussed in detail above, outputs 1025 are generated using the saccadic emulator 305, vertebrate extraction engine 310, fovea extraction engine 315, and the LGN engine 320 included within BIFEE 500. BIFEE 500 extracts a (full) low resolution feature, a high resolution feature, and another low resolution feature from the high resolution feature, all corresponding to the original image 1005.

Example operations performed to generate outputs 1025 are shown in the process 1030 of FIG. 10B, according to some embodiments. Original image 1005 is received or obtained at computing device 900 in operation 1035. A plurality of blocks is generated based on the original image 1005 by the computing device 900 in operation 1040. Operation 1040 is similar to operation 510 of FIG. 5. Next, BIFEE 500 determines or extracts the first feature 1010 in operation 1045. Operation 1045 is similar to operation 515 of FIG. 5. In operation 1050, BIFEE 500 determines the second feature 1015 based on the first feature 1010. Operation 1050 is similar to operation 520 of FIG. 5. Then, BIFEE 500 determines the third feature 1020 based on the second feature 1015 in operation 1055. Operation 1055 is similar to operation 525 of FIG. 5.

In operation 1060, the set of features that have been determined (first, second, and third features 1010, 1015, 1020) in operations 1045-1055 are appropriately stored for future use. Depending on the type of image comprising the original image 1005, the set of extracted features may be stored in a particular device. For example, if original image 1005 is a search or query request, the corresponding set of extracted features may be stored in a different database or storage device than if the original image 1005 is a stored image in a database, in which case, the set of extracted features may populate an extracted database (e.g., database 806).

In order to automatically handle potential differences in the resolution of the image(s) comprising the search or query request and the images searched to obtain search or query results and/or unknown resolutions of any of the images involved in a search, the original image 1005 may be processed more than once by BIFEE 500, in order to determine a plurality of sets of features, each set of features of the plurality of sets of features associated with a particular scaling factor. In an embodiment, a set of n scaling factors may be pre-set and correspondingly, n sets of features may be generated for the original image 1005. If the ith set of features, where i=1 to n, is at i=n, then all n sets of features have been determined (no branch of operation 1065), and process 1030 ends. Otherwise (yes branch of operation 1065), the next set of features (i=i+1) is determined by returning to operation 1045 of process 1030.

As described in detail below, functionalities of BIFEE 500 can be combined with those of the integration search engine 970 to provide an exact (or best) match of an object depicted in images based on spatially fragmented (or partial object) images received/obtained as a search/query request. Examples of spatially fragmented images include, without limitation, eyes, nose, lips, chin, eyebrows, cheeks, a portion of a face, a watch face, a watch band, a bag handle, shoe heel, a portion of a product, or the like.

Figure 11A:
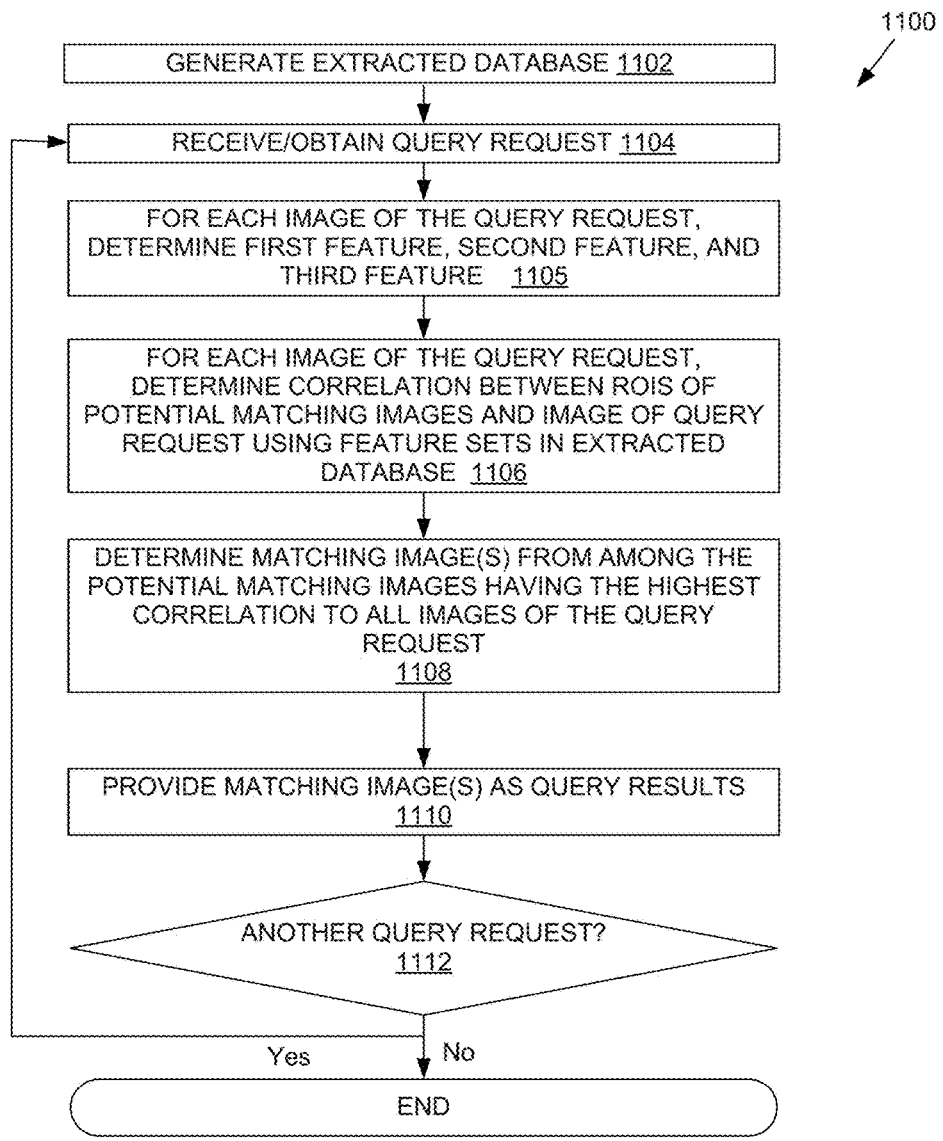
FIGS. 11A-11B and 12 illustrate example processes for the BIFEE and an integration search engine, in accordance with various embodiments.
Figure 11B:
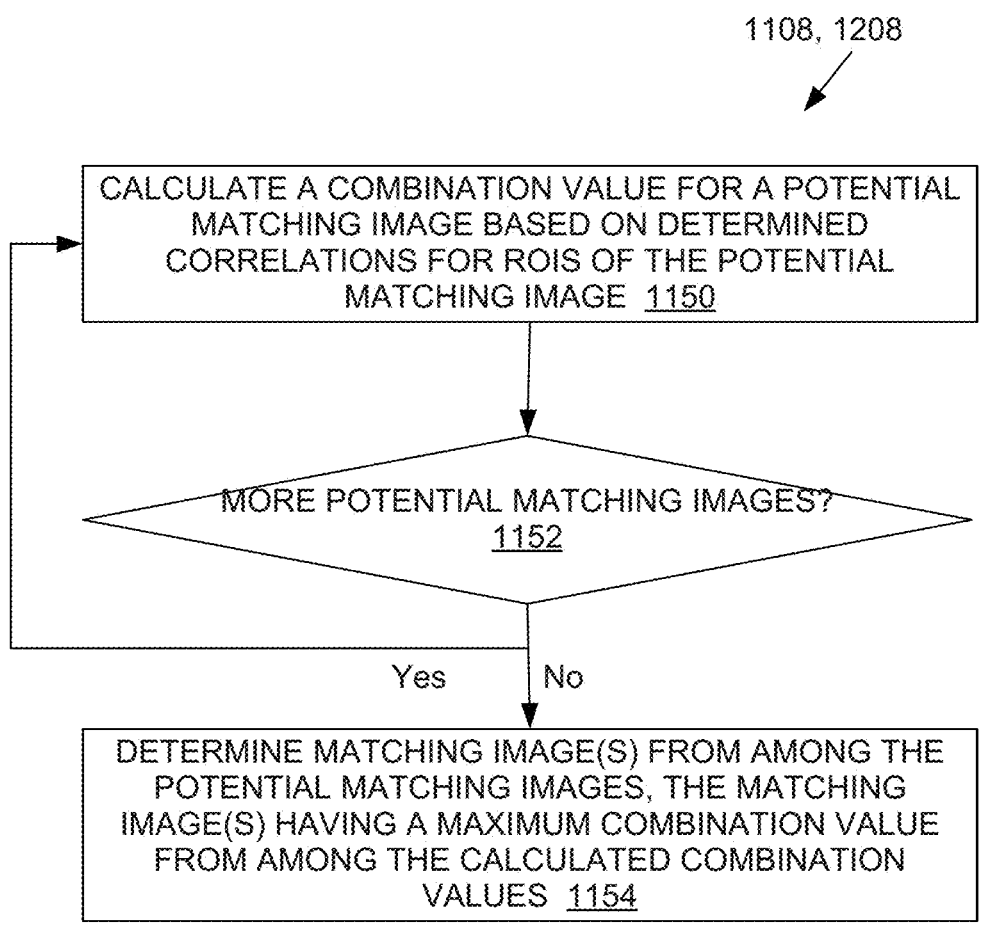

FIGS. 11A-11B illustrate an example first search technique (also referred to as a scaling extracted database search technique) implementing at least BIFEE 500 and integration search engine 970, according to an embodiment. In a process 1100 shown in FIG. 11A, BIFEE 500 of computing device 900 facilitates generation of an extracted database (also referred to as an extraction database, a features database, a scaling extracted database, and the like) in operation 1102. The extracted database is populated with a plurality of sets of features associated with stored images in a database, such as database 806 and/or 808. Each set of features of the plurality of sets of features is determined as described in process 1030. Each of the stored images in the database comprises an original image 1005 for purposes of determining the sets of features associated with the stored images.

In an embodiment, for a given database D (e.g., database 806 or database 808), the corresponding extracted database comprises databases $D^i$ of different scaling image resolutions, in which i=1 to n of n different scaling factors. For each ith scaling factor $D^i$ database, a set of features at the ith scaling factor ($V^i_L$, $V^i_H$, and $V^i_{LGN}$) is generated for each stored image in database D. Thus, for each stored image in database D, a total of n sets of features are included in the extracted database, one set of features for each of the n different scaling factors.

Next, in operation 1104, computing device 900 receives or obtains a query request. The query request may be provided, for example, by a user interfacing with client device 810. The query request can comprise one or more images. The image(s) may be captured (such as via a camera), selected from a plurality of image choices, or otherwise indicated as those of interest in finding an object. The images comprising the query request may be of a portion of an object, overlap in object depicted, not overlap in the object depicted, have the same or different resolution from each other, and the like. In an embodiment, the query request comprises more than one image, and at least one of the images of the query request depicts only a portion of an object. In another embodiment, the query request comprises more than one image and all of the images of the query request depict only a portion of an object.

In operation 1105, for each image included in the query request, associated first feature, second feature, and third feature are determined in accordance with operations 510-525 of FIG. 5.

In operation 1106, for each image of the query request, computing device 900 determines a correlation value between at least one ROI of each potential matching image from among the stored images and a particular image of the query request. The ROIs of potential matching image(s) are identified and their degree of similarity or correlation to the particular image of the query request is calculated using the sets of features in the extracted database (for the stored images) and sets of features associated with the images comprising the query request. Details for determining the correlations and the ROIs are provided in FIG. 7. Note, however, that operations in FIG. 7 directed to determining the "another" or "other" first, second, and/or third features of the stored image may be omitted since sets of features for all of the stored images have already been determined in operation 1102. In alternative embodiments, if operation 1102 is not performed, the feature sets associated with the stored images may be determined as provided in FIG. 7.

The particular image of the query request is compared against the plurality of sets of features stored in the extracted database to identify the ROIs of potential matching images. Because the extracted database includes sets of features at different scaling factors for each stored image, images comprising the query request can be at any resolution and an accurate search may still be performed against the stored images (using sets of features in the extracted database at the same or similar scaling factor as respective images of the query request).

Operation 1106 identifies not only potential matching image(s) from among the plurality of stored images in a database, but also particular ROI(s) of respective potential matching image(s). For example, if the query request comprises a first image and a second image, then one or more first ROIs of first potential matching images are identified using sets of features stored in the extracted database for the first image, and one or more second ROIs of second potential matching images are identified using sets of features stored in the extracted database for the second image. So far, the best (or near best) matches for each component image of the query request has been determined, but not the best (or near best) matches for the combination of all component images of the query request, which provides for the best (or near best) matches to a whole or full object.

In an embodiment, operation 1106 is performed for each ith $D^i$ database, for i=1 to n scaling factors, for each particular image comprising the query request. Moreover, operation 1106 is performed for each image comprising the query request. For example, if the query request comprises three images, then operations illustrated in FIG. 7 may be performed at least n×3 times, n times for n scaled databases $D^i$ per image comprising the query request and repeating the n times for each of the three images of the query request.

In operation 1108, computing device 900, and in particular, integration search engine 970, determines which image(s) from among the potential matching images (identified in operation 1106) are the matching or near matching images for the whole query request. The matching or near matching images are those having the highest or maximum correlation to the combination of all the images comprising the query request. As described in greater detail in FIG. 11B, in one embodiment, for each potential matching image, the correlations associated with particular identified ROIs of the particular potential matching image (e.g., correlations calculated in connection with operation 1106) are summed, and the potential matching image having the highest summed value may be considered the best match for the query request. In other words, the stored image having the highest summed value depicts an object that has the combination of components most similar to those object components depicted in the images comprising the query request. Hence, even if the query request comprises a plurality of partial object images, the query result can comprise a whole or full object (as depicted in the matching image).

In operation 1110, computing device 900 provides the matching image(s) as query results corresponding to the query request. The matching image(s) may comprise one image (the best match) or more than one image (the best and next best match(es)). Computing device 900 may provide the query results to a client device 810 via the network 802.

Next, process 1100 waits for another query request in operation 1112. If there is no other query request (no branch of operation 1112), then process 1100 ends. If there is another query request (yes branch of operation 1112), then process 1100 proceeds to return to operation 1104.

In alternative embodiments, operation 1102 may be performed simultaneously with or after operation 1104. For example, if the database from which the stored images (the original images 1005) will be processed is unknown until a particular query request is received, then operation 1102 may not occur until after operation 1104. As another example, if the stored images are of a sufficiently small data set and/or computational resources are adequate, operation 1102 may be performed on an as-needed basis. In still other embodiments, operation 1102 may comprise a selective generation of the extracted database, in which the resolutions of the images comprising the query request dictates which scaling factor(s) are applicable in the plurality of sets of features to be generated in order to perform at least operation 1106.

FIG. 11B illustrates additional details about operation 1108 of FIG. 11A, according to some embodiments. Operation 1108 includes operations 1150-1154. Recall that in operation 1106 of FIG. 11A, for each image comprising the query request, a correlation value is determined for each ROI of potential matching images, in which each such ROI corresponds to a particular image comprising the query request. In operation 1150, for a particular potential matching image, the (ROI) correlation values associated with the particular potential matching image are combined to generate a combination value for the particular potential matching image. In an embodiment, the combination value may comprise a sum of the correlation values associated with the particular potential matching image.

If there are more potential matching images (yes branch of operation 1152), then the process returns to operation 1150 for the next potential matching image. If a combination value has been calculated for all of the potential matching images (no branch of operation 1152), then integration search engine 970 determines one or more matching images from among the potential matching images based on the combination values calculated in operation 1150. The matching or near matching images are those images having the highest or maximum combination values from among the combination values calculated in operation 1150.

In an embodiment, operations 1150-1154 may be expressed by the following equation.

$$O = f \begin{bmatrix} X_1^T \aleph \\ \ldots \\ X_j^T \aleph \end{bmatrix},$$

where O=final output of the optimal match (e.g., matching images), $X_i$=correlation value, i=1 to j, j=number of images/components comprising the query request, and $\aleph$=original or extracted database. O can be a linear or non-linear function $f$. Function $f$ can be a generic function or a neural network approximation function.

In an alternative embodiment and/or as a simple case of the function expressed above, the following equation may reflect operations 1150-1154.

$$O = \max \left( \text{sum} \begin{bmatrix} X_1^T \aleph \\ \ldots \\ X_j^T \aleph \end{bmatrix} \right).$$

In this manner, each image of a plurality of images comprising a query request may be treated as a separate "search" component and accordingly searched independently of each other within the extracted database for potential matching image(s). And then the correlations between each of the "search" components to a particular potential matching image may be combined to determine a combination or composite correlation between all of the "search" components and the particular potential matching image. The potential matching image(s) associated with the highest (or sufficiently high) combination/composite correlation are deemed to be matches to the query request as a whole.

Figure 12:
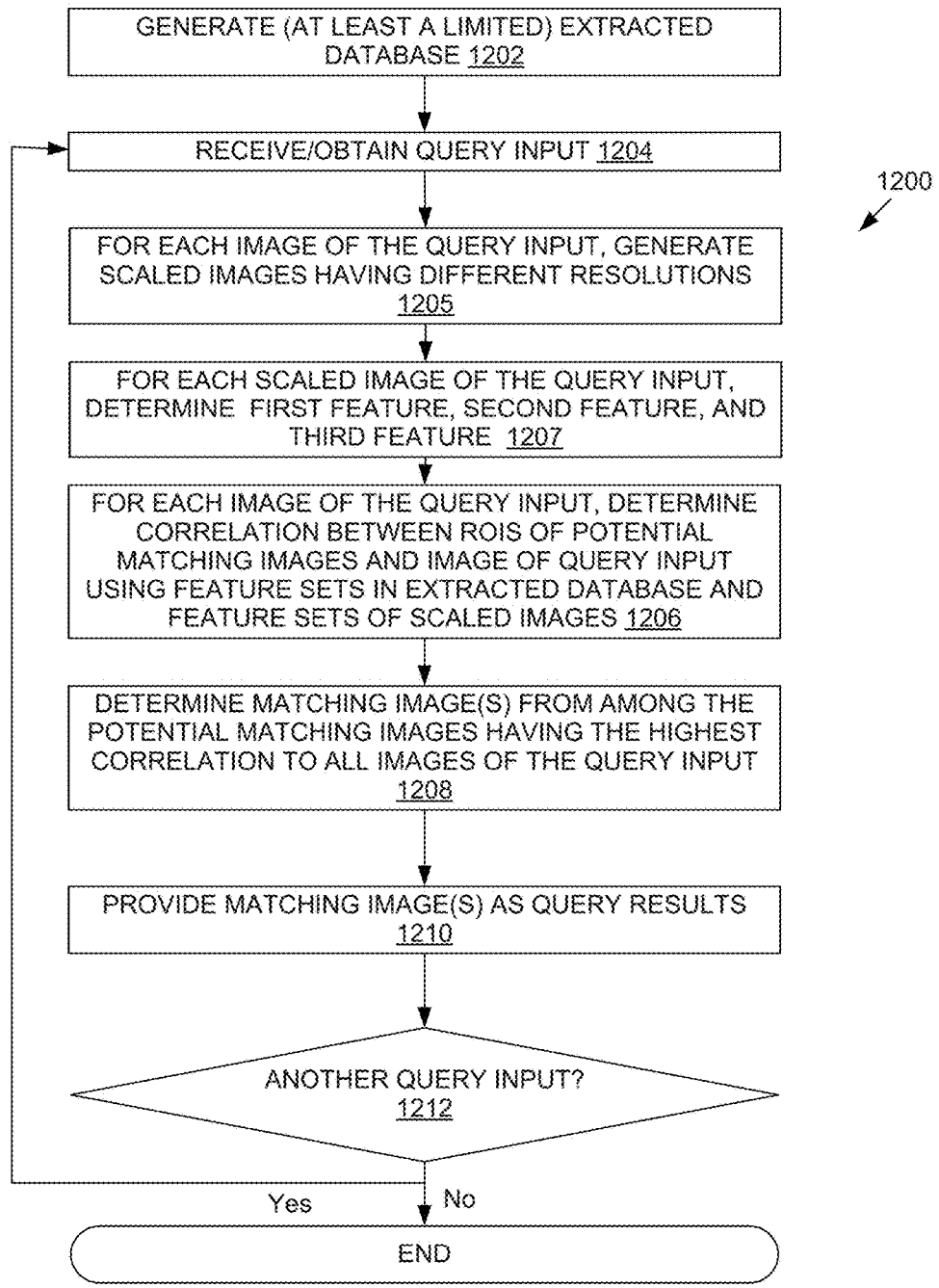

FIGS. 12 and 11B illustrate an example second search technique (also referred to as a scaling input image search technique) implementing at least BIFEE 500 and integration search engine 970, according to an embodiment. Referring to a process 1200 shown in FIG. 12, computing device 900, and in particular, BIFEE 500, facilitates generation of at least a limited extracted database in operation 1202. In an embodiment, the extracted database in operation 1202 may be populated with a subset of the data stored in the full extracted database as in operation 1102 of FIG. 11A. Instead of each stored image in the (original) database having n sets of features for n different scaling factors, each stored image may have fewer than n sets of features. For example, a single set of first, second, and third features ($V_L$, $V_H$, $V_{LGN}$) at a particular scaling factor may be determined for each of the stored images. In alternate embodiments, the extracted database may be populated with n sets of features for each stored image. Whether one or more sets of features are stored in the extracted database per stored image, each set of features is determined as described in process 1030. Similar to the description above for operation 1102 of FIG. 11A, each stored image in the database comprises an original image 1005 for purposes of generating the sets of features populating the full or limited extracted database.

Next, in operation 1204, computing device 900 receives or obtains a query request comprising images, such as from a client device 810. Operation 1204 is similar to operation 1104 of FIG. 11A.

In an embodiment, a limited extracted database populated with feature sets at a particular scaling factor may be sufficient because each of the images comprising the query request is scaled at each of n different scaling factors in operation 1205 to ensure that images of the same or similar resolution are compared to each other between the query request and stored images. Instead of scaling database D by generating scaled databases $D^i$ of i=1 to n different scaling factors in process 1100, computing device 900 generates n different scaled images of each of the images comprising the query request in operation 1205. Even if images comprising the query request are of the same or different resolution from each other and/or one or more stored images in the (original) database, by scaling all of the images comprising the query request at a plurality of different scaling factors, one or more scaled versions of the images comprising the query request will be the same or similar resolution as the resolution of feature sets associated with stored images in the extracted database.

In operation 1207, after scaled images associated with each of the images of the query request are generated in operation 1205 and before the correlations are determined, computing device 900 determines a set of features (first feature, second feature, and third feature) for each scaled image in operation 1207. Each set of features is determined by BIFEE 500 as described in FIG. 10B, in which each scaled image comprises an original image 1005 for purposes of extracting the associated set of features therefrom. For instance, each image comprising the query request may be scaled in eight different scaling factors: 1.0, 0.9, 0.8, 0.7, 0.6, 0.5, 0.4, and 0.3, and then each of the eight scaled images corresponding to a respective image comprising the query request may be processed to extract the vertebrate, fovea, and LGN-type features.

Next in operation 1206, computing device 900 determines correlations between ROIs of potential matching images and images of the query request based on sets of features associated with the stored images and sets of features associated with the scaled images. In an embodiment, for a given image of the query request, a feature set of the scaled images (at each of n different scaling factors) corresponding to the given image is compared/searched against the feature set corresponding to each of the respective stored images in the extracted database to determine the correlations. Details relating to correlation determination based on feature sets associated with the stored images and feature sets associated with input/captured images are described above in connection with FIG. 7. Note, however, that operations in FIG. 7 directed to determining the "another" or "other" first, second, and/or third features of the stored image may be omitted since sets of features for all of the stored images have already been determined in operation 1202. In alternative embodiments, if operation 1202 is not performed, the feature sets associated with the stored images may be determined as provided in FIG. 7. Moreover, the first, second, and third features mentioned in FIG. 7 refers to first, second, and third features associated with scaled images (not the original images comprising the query request) in the context of operation 1206.

Recall that in operation 1205 of FIG. 12, scaled images $S_i$, for i=1 to n of n different scaling factors or resolutions, are generated for each image $I_k$ comprising the query request, where k=1 to m of m total images comprising the query request. Image $I_k$ is also referred to as an image component, input component, or the like. Thus, for a query request having m images, m×n number of scaled images are generated that correspond to the images comprising the query request.

In an embodiment, the process of FIG. 7 is performed for each scaled image $S_i$ of every image comprising the query request. Thus, the process of FIG. 7 may be performed n×m times, n times for the n different scaled images $S_i$ corresponding to an image of the query request per an image of the query request and m times for each of the m images comprising the query request.

Next, integration search engine 970 determines matching image(s) from among the potential matching images in operation 1208, provides the matching image(s) as query results in operation 1210, and processes the next query request, if any, in operation 1212. Operations 1208, 1210, and 1212 are similar to respective operations 1108, 1110, and 1112 of FIG. 11A.

In alternative embodiments, operation 1202 may be performed simultaneously with or after operation 1204 or 1205.

FIG. 11B illustrates additional details about operation 1208, according to some embodiments. Because versions of the images comprising the query request are used in calculating correlation values—namely the scaled images $S_i$, where i=1 to n for $I_k$ images of the query request, where k=1 to m, the matching images are found based on correlations associated with the scaled images. For example, in the sums and function $f$ discussed above, correlation value $X_i$ comprises the correlation values associated with the scaled images $S_i$ for all m images of the query request.

The search techniques described in FIGS. 11A and 12 can be used to facilitate commerce, marketing, sales, advertisement, object recognition, object identification, object recommendation, object search, and the like.

In an embodiment, a user may find desired objects by providing partial object features as the query request. Based on images of fragmented visual components or parts of a desired object specified by the user (e.g., the user takes photos of desired object features using his or her mobile device and provides those as the query request), the search techniques described herein searches a database of object images (e.g., database 806 or third party database 808) and returns image(s) of objects that best match the combination of desired object features depicted in the user-specified input images. In addition to returning images of best matching objects, supplemental information may be provided to facilitate a product purchase, such as product identification information, prices, lowest price, nearest retailer, and promotional content (e.g., coupons, etc.) to entice a product purchase, advertisement, related, competing, and/or complementary product recommendations, and the like.

Figure 13:
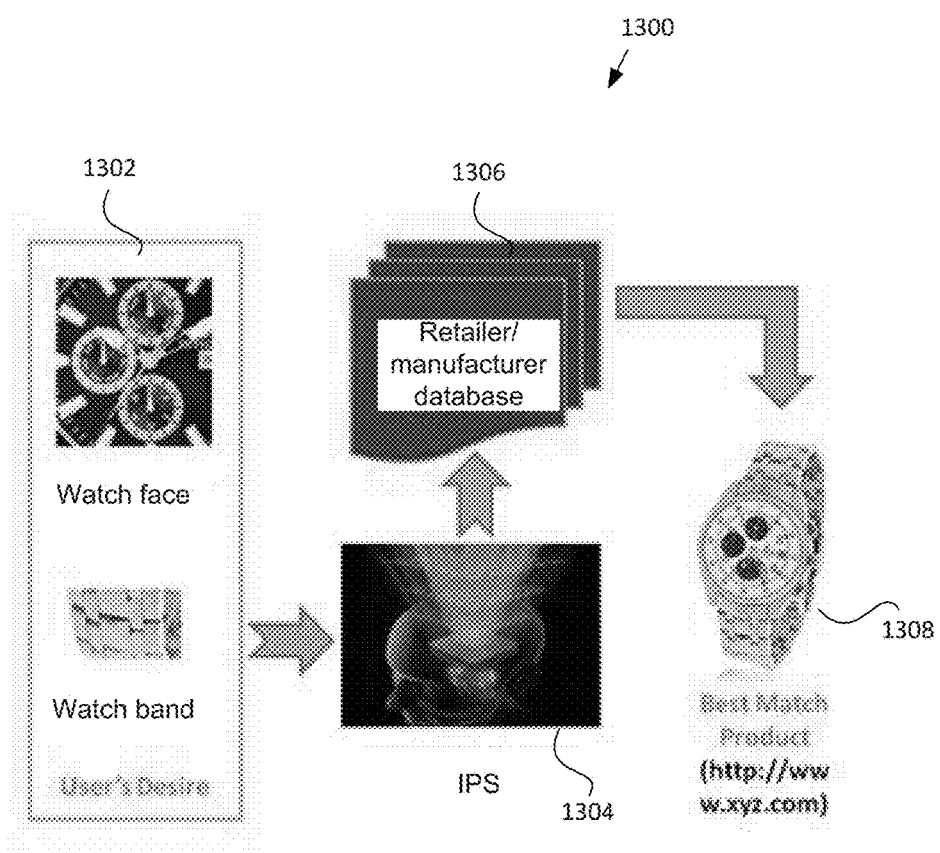
FIG. 13 illustrates an example block diagram of an integrated object search, in accordance with various embodiments.

FIG. 13 illustrates an example block diagram 1300 showing use of an integration product search system (IPS) according to some embodiments. IPS implements the search techniques described above using the functionalities of at least BIFEE 500 and integration search engine 970. As an example, IPS may be included in computing device 900. As shown in FIG. 13, a user specifies desired features of a watch as a query request 1302; namely, specifying (or selecting or uploading) a first image of a particular watch face and a second image of a particular watch band. Note that each of the first and second images comprises a partial image in that each image depicts only a portion of a watch. The query request 1302 may be provided using client device 810. Query request 1302 is received by IPS 1304 to find one or more watches having the particular watch face and watch band. IPS 1304 interfaces with a retailer/manufacturer database 1306 to perform the search. Retailer/manufacturer database 1306 may comprise the third party database 808. Retailer/manufacturer database 1306 may comprise one or more databases maintained or associated with watch sellers, distributors, and/or manufacturers.

IPS 1304 finds one or more watch images from among a plurality of watch images in the retailer/manufacturer database 1306 that best matches both the first and second images comprising the query request 1302. The best matching watch image 1308 is provided to the user, such as displayed on the user's client device 810, along with one or more supplemental information. FIG. 13 shows a watch image and the uniform resource locator (URL) of where the watch may be purchased and/or was found. Although not shown in FIG. 13, best matching watch image 1308 may comprise more than one watch image, such as the two or more top best matching watches.

Note that although all of the images comprising the query request 1302 depict partial watch features, the query result (best matching watch image 1308) corresponding to the query request 1302 comprises an image depicting a whole or full watch that includes a watch face, watch band, and other watch features (e.g., watch stem, watch casing, etc.). Thus, IPS 1304 is able to find whole/full objects based on partial object features, which may be fragmented from each other or even necessarily identify the object type.

Figure 14A:
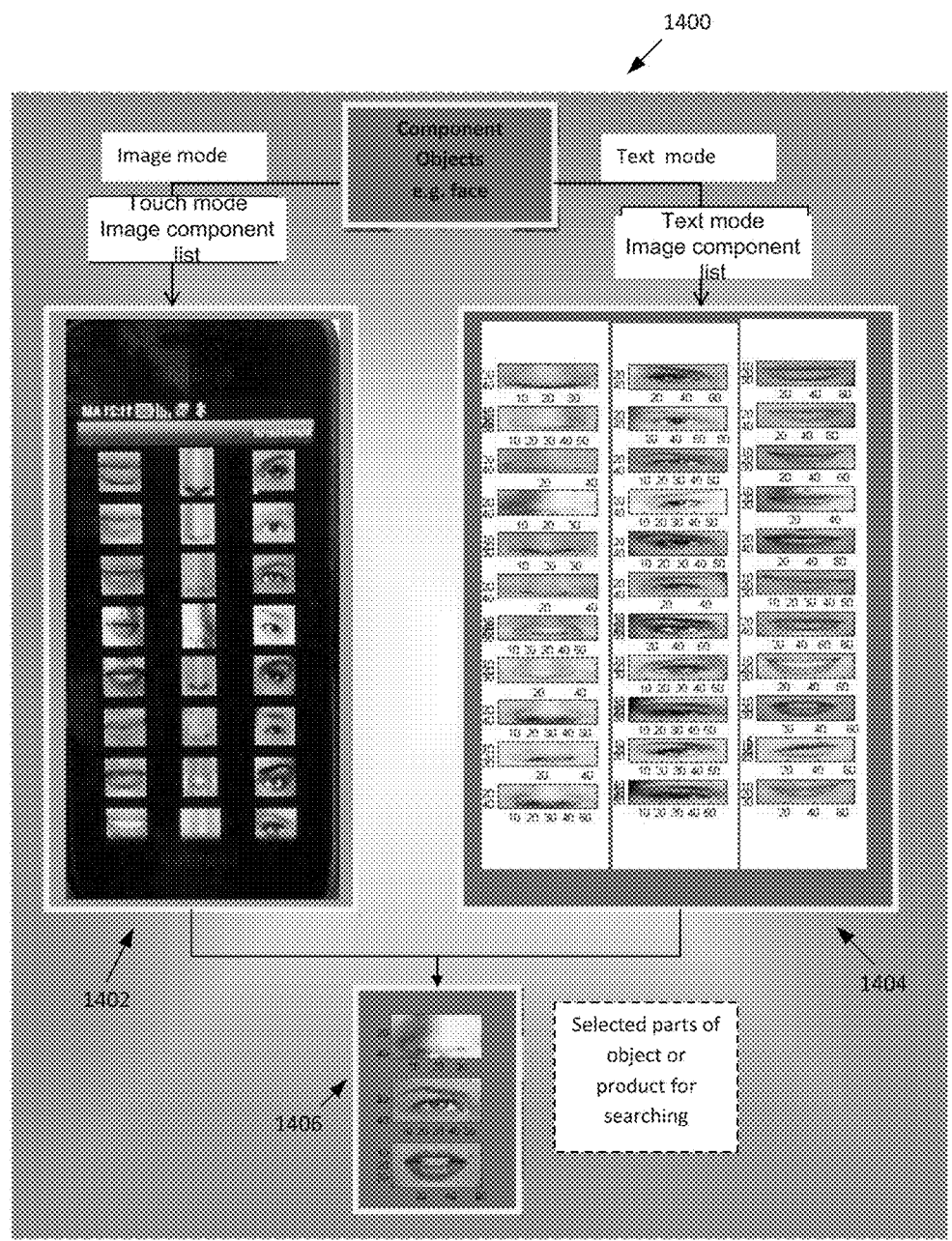
FIGS. 14A-14B illustrate example screenshots associated with an example integrated object searching system, in accordance with various embodiments.

FIG. 14 illustrates an example query request screen 1400 showing use of IPS 1304 according to an alternative embodiment. The user may be provided query request screen 1400 as part of a user interface provided by an app, to facilitate formulating a query request. A user may specify the query request, among other things, by selecting from a list of image options. If the object of interest is a human face, a touch mode option 1402 provides a plurality of facial feature types (e.g., lips, nose, and eyes) and a plurality of images (e.g., 8) for each facial feature type of the plurality of facial feature types. The user may select an image of each of a particular lip, nose, and eyes from among the displayed choices to form a query request 1406 comprising three partial images.

Or the user may specify the query request by selecting from a text mode option 1404, which may be provided on a non-touch screen (e.g., on a laptop or desktop), includes textual information in addition to a plurality of facial feature image options, and/or otherwise involves use of text in specifying images forming the query request 1406.

Although not shown in screen 1400, the user may additionally have a third option to directly provide the images comprising the query request 1406. For example, the user may take three photos of a desired lips, eyes, and nose, respectively, and then upload the photos as the query request to IPS 1304.

Figure 14B:
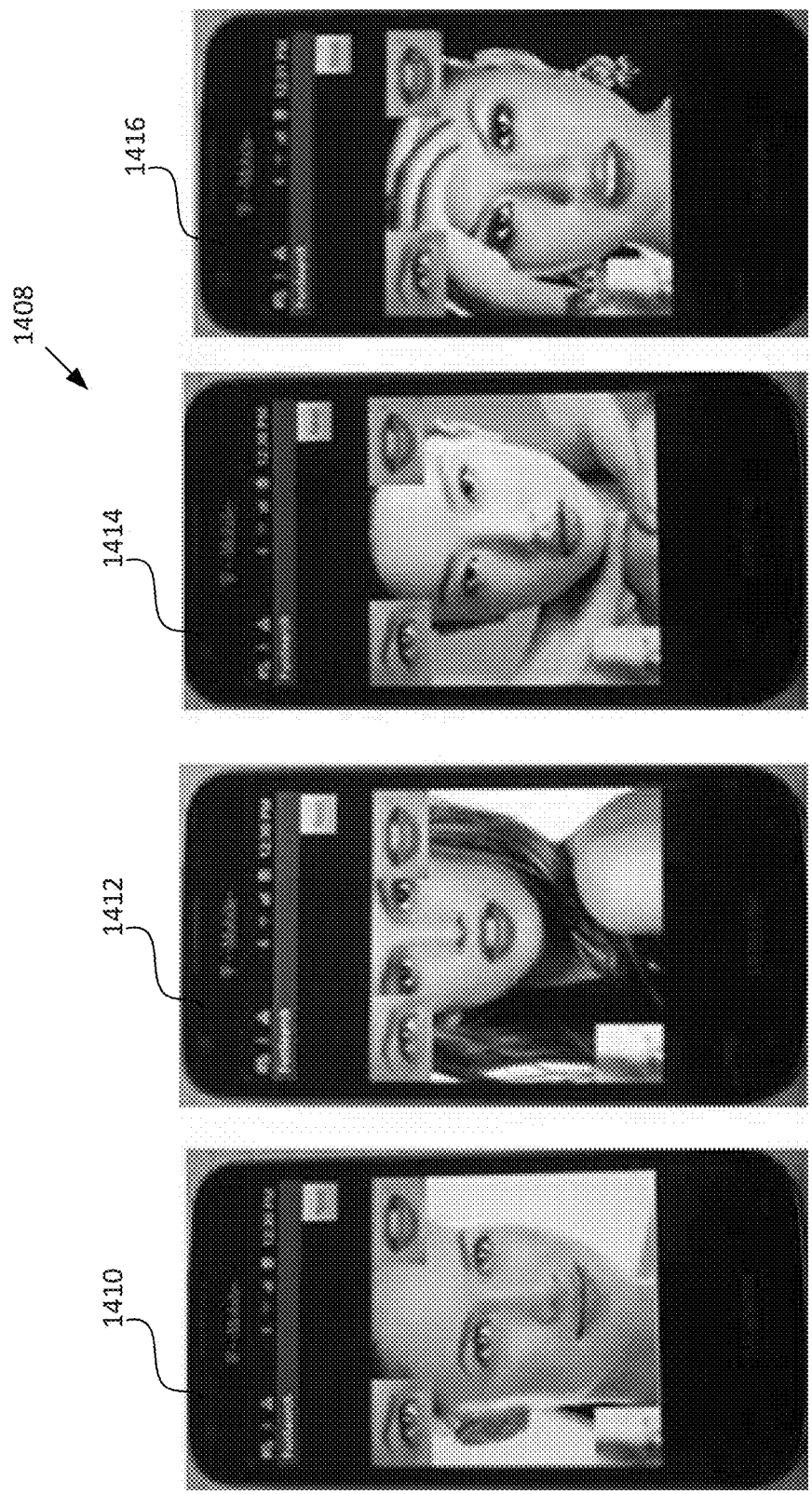

Once the user specifies the query request 1406 (in any which manner), query output corresponding to query request 1406 may be provided to the user by IPS 1304. FIG. 14B shows an output screen 1408 which displays four face images that best match the combination of the particular lips, eyes, and nose specified in the query request 1406. The query output may be shown in ranked order, such as a best match image 1410, a second best match image 1412, a third best match image 1414, and a fourth best match image 1416.

Some Non-Limiting Examples are Provided Below.

Example 1 may include one or more computer-readable media having instructions that, when executed, cause a computing device to: generate a plurality of blocks from a captured image, wherein each block of the plurality of blocks is representative of a corresponding region of the captured image; extract a first feature from at least one block of the plurality of blocks; determine a second feature based at least on the first feature; determine a third feature based on the second feature; and determine, as a matching image, a stored image from among a plurality of stored images including an object that has greatest maximum correlation with the third feature. The one or more computer-readable media may be non-transitory computer-readable media.

Example 2 may include the one or more computer-readable media of example 1 and/or some other examples herein, wherein the first feature is a low resolution feature, the second feature is a high resolution feature, and the third feature is a low resolution version of the second feature.

Example 3 may include the one or more computer-readable media of any of examples 1, 2, and/or some other examples herein, wherein the plurality of blocks are obtained based on a saccadic eye movement emulation, and wherein the second feature is determined based on the first feature and a block of the plurality of blocks that is a closest central position of the saccadic eye movement emulation.

Example 4 may include the one or more computer-readable media of any of examples 1-3 and/or some other examples herein, wherein, to determine the second feature, the instructions further cause the computing device, in response to execution of the instructions by the computing device, to: perform a local background suppression and zoom-in operation on the first feature.

Example 5 may include the one or more computer-readable media of any of examples 1-4 and/or some other examples herein, wherein, to determine the third feature from the second feature, the instructions further cause the computing device, in response to execution of the instructions by the computing device, to: perform a downsampling operation or a decimation operation on the second feature to generate the third feature.

Example 6 may include the one or more computer-readable media of any of examples 1-5 and/or some other examples herein, wherein the instructions further cause the computing device, in response to execution of the instructions by the computing device, to: obtain the plurality of stored images from a database using the first feature and the second feature, and for each image of the plurality of images from the database, determine whether an image of the plurality of stored images has a correlated object, the correlated object being an object having a first maximum correlation between the first feature and the object that is greater than a first threshold and a second maximum correlation between the second feature and the object that is greater than a second threshold, determine a first region of interest (ROI) of the correlated object for the first feature and a second ROI of the correlated object for the second feature, determine a third maximum correlation between the third feature and the first ROI and a fourth maximum correlation between the third feature and the second ROI, store, in the database, the first ROI in association with a value equal to the fourth maximum correlation when the fourth maximum correlation is greater than the third maximum correlation and the fourth maximum correlation is greater than a third threshold, or store the second ROI in association with the value that is equal to the third maximum correlation when the fourth maximum correlation is less than the third maximum correlation and the third maximum correlation is greater than the third threshold, and wherein to determine the matching image, the instructions cause the computing device to determine an image from the database stored in association with a greatest value.

Example 7 may include the one or more computer-readable media of any of examples 1-6 and/or some other examples herein, wherein the instructions further cause the computing device, in response to execution of the instructions by the computing device, to: obtain the plurality of stored images from a database using the first feature and the second feature, and for each image of the plurality of images from the database, determine another first feature for an image of the plurality of stored images and another third feature for the image of the plurality of images, determine a first ROI of the image of the plurality of stored images using the other first feature, determine a first maximum correlation between the other first feature and an object within the image of the plurality of stored images, when the first maximum correlation is greater than a first threshold, determine a second maximum between the other third feature and the third feature and a third maximum correlation between the first ROI and the third feature, determine a second ROI of the image of the plurality of stored images using the other third feature, and when the second maximum correlation is greater than the third maximum correlation, store, in the database, the second ROI in association with a value, wherein the value is equal to the second maximum correlation, when the second maximum correlation is less than the third maximum correlation, store, in the database, the first ROI in association with the value, wherein the value is equal to the third maximum correlation, and wherein to determine the matching image, the instructions cause the computing device to determine an image from the database stored in association with a greatest value.

Example 8 may include the one or more computer-readable media of any of examples 1-7 and/or some other examples herein, wherein the instructions further cause the computing device, in response to execution of the instructions by the computing device, to: determine one or more shape features of the first ROI and the second ROI using a feature extraction algorithm (FEA) or using a dominant based principal component analysis (DPCA).

Example 9 may include the one or more computer-readable media of any of examples 1-8 and/or some other examples herein, wherein the first feature is extracted using an FEA or DPCA.

Example 10 may include the one or more computer-readable media of examples 1-9 and/or some other examples herein, wherein the first feature is a vertebrate feature, the second feature is a fovea feature, and the third feature is a lateral geniculate nucleus (LGN) feature.

Example 11 may include a computing device comprising: at least one processor; a saccadic emulator to be operated by the at least one processor to generate, from an obtained image, one or more blocks, wherein each block of the one or more blocks is representative of a region of the obtained image; a vertebrate extraction engine to be operated by the at least one processor to extract one or more vertebrate features from the one or more blocks, wherein the one or more vertebrate features are representative of low resolution blocks of the one or more blocks; a fovea extraction engine to be operated by the at least one processor to extract one or more fovea features from the one or more blocks, wherein the one or more fovea features are representative of high resolution blocks of the one or more blocks; and a lateral geniculate nucleus (LGN) engine to be operated by the at least one processor to extract one or more LGN features based on the one or more fovea features; and determine, as a matching image, a stored image from among a plurality of stored images including an object that has greatest maximum correlation with the one or more LGN feature from among a set of stored images.

Example 12 may include the computing device of example 11 and/or some other examples herein, wherein the one or more vertebrate features are extracted using a feature extraction algorithm (FEA) or using a dominant based principal component analysis (DPCA).

Example 13 may include the computing device of any of examples 11-12 and/or some other examples herein, wherein the saccadic emulator is to emulate saccadic eye movements to generate the plurality of blocks, and wherein the one or more fovea features are determined based on the one or more vertebrate features and a block of the plurality of blocks that is a closest central position of the saccadic eye movements of the emulation.

Example 14 may include the computing device of any of examples 11-13 and/or some other examples herein, wherein, to determine the one or more fovea features, the fovea extraction engine is to perform a local background suppression and zoom-in operation on each of the one or more vertebrate features.

Example 15 may include the computing device any of examples 11-14 and/or some other examples herein, wherein, to determine the one or more LGN features from the one or more fovea features, the LGN engine is to perform a downsampling operation or a decimation operation on each of the one or more fovea features to generate each of the one or more LGN features.

Example 16 may include the computing device of any of examples 11-15 and/or some other examples herein, wherein the LGN engine is further to: obtain the plurality of stored images from a database using the first feature and the second feature, and for each image of the plurality of images from the database, determine whether an image of the plurality of stored images has a correlated object, the correlated object being an object having a first maximum correlation between the first feature and the object that is greater than a first threshold and a second maximum correlation between the second feature and the object that is greater than a second threshold, determine a first region of interest (ROI) of the correlated object for the first feature and a second ROI of the correlated object for the second feature, determine a third maximum correlation between the third feature and the first ROI and a fourth maximum correlation between the third feature and the second ROI, store, in the database, the first ROI in association with a value equal to the third maximum correlation when the fourth maximum correlation is greater than the third maximum correlation and the fourth maximum correlation is greater than a third threshold, or store the second ROI in association with the value that is equal to the third maximum correlation when the fourth maximum correlation is less than the third maximum correlation and the third maximum correlation is greater than the third threshold, and wherein to determine the matching image, the LGN engine is to determine an image from the database stored in association with a greatest value.

Example 17 may include the computing device of any of examples 11-16 and/or some other examples herein, wherein the LGN engine is to: obtain the plurality of stored images from a database using the first feature and the second feature, and for each image of the plurality of images from the database, determine another first feature for an image of the plurality of stored images and another third feature for the image of the plurality of images, determine a first ROI of the image of the plurality of stored images using the other first feature, determine a first maximum correlation between the other first feature and an object within the image of the plurality of stored images, when the first maximum correlation is greater than a first threshold, determine a second maximum between the other third feature and the third feature and a third maximum correlation between the first ROI and the third feature, determine a second ROI of the image of the plurality of stored images using the other third feature, and when the second maximum correlation is greater than the third maximum correlation, store, in the database, the second ROI in association with a value, wherein the value is equal to the second maximum correlation, when the second maximum correlation is less than the third maximum correlation, store, in the database, the first ROI in association with the value, wherein the value is equal to the third maximum correlation, and wherein to determine the matching image, the LGN engine is to determine an image from the database stored in association with a greatest value.

Example 18 may include the computing device of any of examples 11-17 and/or some other examples herein, wherein the LGN engine is to: determine one or more shape features of the first ROI and the second ROI using a feature extraction algorithm (FEA) or using a dominant based principal component analysis (DPCA).

Example 19 may include the computing device of any of examples 11-18 and/or some other examples herein, further comprising: a communication module; and device interface circuitry, wherein the image is to be obtained via one of the communication module or the device interface circuitry.

Example 20 may include a computer-implemented method comprising: generating, by a computing device, a plurality of blocks from a captured image, wherein each block of the plurality of blocks is representative of a corresponding region of the captured image; extracting, by the computing device, a first feature from at least one block of the plurality of blocks; determining, by the computing device, a second feature based at least on the first feature; determining, by the computing device, a third feature based on the second feature; and determining, by the computing device, as a matching image, a stored image from among a plurality of stored images including an object that has greatest maximum correlation with the third feature.

Example 21 may include the method of example 20 and/or some other examples herein, wherein the first feature is a low resolution feature, the second feature is a high resolution feature, and the third feature is a low resolution version of the second feature.

Example 22 may include the method of any of examples 20-21 and/or some other examples herein, wherein the plurality of blocks are obtained based on a saccadic eye movement emulation, and wherein the second feature is determined based on the first feature and a block of the plurality of blocks that is a closest central position of the saccadic eye movement emulation.

Example 23 may include the method of any of examples 20-22 and/or some other examples herein, further comprising: performing, by the computing device, a local background suppression and zoom-in operation on the first feature.

Example 24 may include the method of any of examples 20-23 and/or some other examples herein, wherein determining the third feature from the second feature comprises: performing, by the computing device, a down sampling operation or a decimation operation on the second feature to generate the third feature.

Example 25 may include the method of any of examples 20-24 and/or some other examples herein, further comprising: obtaining, by the computing device, the plurality of stored images from a database using the first feature and the second feature, and for each image of the plurality of images from the database, determining, by the computing device, whether an image of the plurality of stored images has a correlated object, the correlated object being an object having a first maximum correlation between the first feature and the object that is greater than a first threshold and a second maximum correlation between the second feature and the object that is greater than a second threshold, determining, by the computing device, a first region of interest (ROI) of the correlated object for the first feature and a second ROI of the correlated object for the second feature, determining, by the computing device, a third maximum correlation between the third feature and the first ROI and a fourth maximum correlation between the third feature and the second ROI, storing or causing to store, by the computing device, in the database, the first ROI in association with a value equal to the fourth maximum correlation when the fourth maximum correlation is greater than the third maximum correlation and the fourth maximum correlation is greater than a third threshold, or storing or causing to store, by the computing device, the second ROI in association with the value that is equal to the third maximum correlation when the fourth maximum correlation is less than the third maximum correlation and the third maximum correlation is greater than the third threshold, and wherein determining the matching image comprises determining, by the computing device, an image from the database stored in association with a greatest value.

Example 26 may include the method of any of examples 20-25 and/or some other examples herein, further comprising: obtaining, by the computing device, the plurality of stored images from a database using the first feature and the second feature, and for each image of the plurality of images from the database, determining, by the computing device, another first feature for an image of the plurality of stored images and another third feature for the image of the plurality of images, determining, by the computing device, a first ROI of the image of the plurality of stored images using the other first feature, determining, by the computing device, a first maximum correlation between the other first feature and an object within the image of the plurality of stored images, when the first maximum correlation is greater than a first threshold, determining, by the computing device, a second maximum between the other third feature and the third feature and a third maximum correlation between the first ROI and the third feature, determining, by the computing device, a second ROI of the image of the plurality of stored images using the other third feature, and when the second maximum correlation is greater than the third maximum correlation, storing, by the computing device in the database, the second ROI in association with a value, wherein the value is equal to the second maximum correlation, when the second maximum correlation is less than the third maximum correlation, storing, by the computing device in the database, the first ROI in association with the value, wherein the value is equal to the third maximum correlation, and wherein to determine the matching image, the instructions cause the computing device to determine an image from the database stored in association with a greatest value.

Example 27 may include the method of any of examples 20-26 and/or some other examples herein, wherein the instructions further cause the computing device, in response to execution of the instructions by the computing device, to: determining, by the computing device, one or more shape features of the first ROI and the second ROI using a feature extraction algorithm (FEA) or using a dominant based principal component analysis (DPCA).

Example 28 may include the method of any of examples 20-27 and/or some other examples herein, wherein the first feature is extracted using an FEA or DPCA.

Example 29 may include the method of any of examples 20-28 and/or some other examples herein, wherein the first feature is a vertebrate feature, the second feature is a fovea feature, and the third feature is a lateral geniculate nucleus (LGN) feature.

Example 30 may include at least one computer-readable medium including instructions that, when executed by one or more processors of a computing device, cause the computing device to execute the method of any one of examples 20-29 and/or some other examples herein.

Example 31 may include a computing device comprising: saccadic emulation means for generating, from an obtained image, one or more blocks, wherein each block of the one or more blocks is representative of a region of the obtained image; vertebrate extraction means for extracting one or more vertebrate features from the one or more blocks, wherein the one or more vertebrate features are representative of low resolution blocks of the one or more blocks; fovea extraction means for extracting one or more fovea features from the one or more blocks, wherein the one or more fovea features are representative of high resolution blocks of the one or more blocks; and lateral geniculate nucleus (LGN) means for extracting one or more LGN features based on the one or more fovea features; and determine, as a matching image, a stored image from among a plurality of stored images including an object that has greatest maximum correlation with the one or more LGN feature from among a set of stored images.

Example 32 may include the computing device of example 31 and/or some other examples herein, wherein the one or more vertebrate features are extracted using a feature extraction algorithm (FEA) or using a dominant based principal component analysis (DPCA).

Example 33 may include the computing device of any of examples 30-32 and/or some other examples herein, wherein the saccadic emulation means is for emulating saccadic eye movements to generate the plurality of blocks, and wherein the one or more fovea features are determined based on the one or more vertebrate features and a block of the plurality of blocks that is a closest central position of the saccadic eye movements of the emulation.

Example 34 may include the computing device of any of examples 30-33 and/or some other examples herein, wherein the fovea extraction means is to determine the one or more fovea features by performing a local background suppression and zoom-in operation on each of the one or more vertebrate features.

Example 35 may include the computing device any of examples 30-34 and/or some other examples herein, wherein the LGN engine is to determine the one or more LGN features from the one or more fovea features by performing a downsampling operation or a decimation operation on each of the one or more fovea features to generate each of the one or more LGN features.

Example 36 may include the computing device of any of examples 30-35 and/or some other examples herein, wherein the LGN means is further for: obtaining the plurality of stored images from a database using the first feature and the second feature, and for each image of the plurality of images from the database, determining whether an image of the plurality of stored images has a correlated object, the correlated object being an object having a first maximum correlation between the first feature and the object that is greater than a first threshold and a second maximum correlation between the second feature and the object that is greater than a second threshold, determining a first region of interest (ROI) of the correlated object for the first feature and a second ROI of the correlated object for the second feature, determining a third maximum correlation between the third feature and the first ROI and a fourth maximum correlation between the third feature and the second ROI, storing, in the database, the first ROI in association with a value equal to the third maximum correlation when the fourth maximum correlation is greater than the third maximum correlation and the fourth maximum correlation is greater than a third threshold, or storing the second ROI in association with the value that is equal to the third maximum correlation when the fourth maximum correlation is less than the third maximum correlation and the third maximum correlation is greater than the third threshold, and wherein the LGN means is to determine the matching image by determining an image from the database stored in association with a greatest value.

Example 37 may include the computing device of any of examples 30-36 and/or some other examples herein, wherein the LGN means is further for: obtaining the plurality of stored images from a database using the first feature and the second feature, and for each image of the plurality of images from the database, determining another first feature for an image of the plurality of stored images and another third feature for the image of the plurality of images, determining a first ROI of the image of the plurality of stored images using the other first feature, determining a first maximum correlation between the other first feature and an object within the image of the plurality of stored images, when the first maximum correlation is greater than a first threshold, determining a second maximum between the other third feature and the third feature and a third maximum correlation between the first ROI and the third feature, determining a second ROI of the image of the plurality of stored images using the other third feature, and when the second maximum correlation is greater than the third maximum correlation, storing, in the database, the second ROI in association with a value, wherein the value is equal to the second maximum correlation, when the second maximum correlation is less than the third maximum correlation, storing, in the database, the first ROI in association with the value, wherein the value is equal to the third maximum correlation, and wherein the LGN means is to determine the matching image by determining an image from the database stored in association with a greatest value.

Example 38 may include the computing device of any of examples 30-37 and/or some other examples herein, wherein the LGN means is further for: determining one or more shape features of the first ROI and the second ROI using a feature extraction algorithm (FEA) or using a dominant based principal component analysis (DPCA).

Example 39 may include the computing device of any of examples 30-38 and/or some other examples herein, further comprising: communication means; and device interface means, wherein one of the communication means and the device interface means is for obtaining the image.

Example 40 may comprise various combinations and/or sub-combinations of examples 1-39.

Example 41 may include one or more computer-readable media having instructions that, when executed, cause a computing device to: receive a query request comprising a first image and a second image; determine a correlation between at least a first region of interest (ROI) of a first potential matching image, from among a plurality of stored images, and the first image based on a third feature associated with the first potential matching image and the first image, wherein the first potential matching image is associated with a first feature determined from the first potential matching image, a second feature determined based on the first feature, and the third feature associated with the first potential matching image determined based on the second feature; determine a correlation between at least a second region of interest (ROI) of a second potential matching image, from among the plurality of stored images, and the second image based on a third feature associated with the second potential matching image and the second image, wherein the second potential matching image is associated with a first feature determined from the second potential matching image, a second feature determined based on the first feature of the second potential matching image, and the third feature associated with the second potential matching image determined based on the second feature of the second potential matching image; and determine, as query results, an image from among the first potential matching image and the second potential matching image that has maximum correlation to both the first image and the second image. The one or more computer-readable media may be non-transitory computer-readable media.

Example 42 may include the one or more computer-readable media of example 41 and/or some other examples herein, wherein the first image depicts only a portion of an object and the image determined to be the query results depicts the object.

Example 43 may include the one or more computer-readable media of any of examples 41-42 and/or some other examples herein, wherein the object comprises a product or a face.

Example 44 may include the one or more computer-readable media of any of examples 41-43 and/or some other examples herein, wherein the first feature determined from the first potential matching image comprises a vertebrate feature, the second feature comprises a fovea feature, and the third feature associated with the first potential matching image comprises a lateral geniculate nucleus (LGN) feature.

Example 45 may include the one or more computer-readable media of any of examples 41-44 and/or some other examples herein, wherein the first feature determined from the first potential matching image comprises a low resolution feature, the second feature comprises a high resolution feature, and the third feature associated with the first potential matching image comprises a low resolution version of the second feature.

Example 46 may include the one or more computer-readable media of any of examples 41-45 and/or some other examples herein, wherein the instructions further cause the computing device, in response to execution of the instructions by the computing device, to: generate a plurality of blocks from a captured image, wherein each block of the plurality of blocks is representative of a corresponding region of the captured image; extract a first feature of the captured image from at least one block of the plurality of blocks; determine a second feature of the captured image based at least on the first feature of the captured image; and determine a third feature of the captured image based on the second feature of the captured image; wherein the captured image comprises each stored image of the plurality of stored images.

Example 47 may include the one or more computer-readable media of any of examples 41-46 and/or some other examples herein, wherein the instructions further cause the computing device, in response to execution of the instructions by the computing device, to: perform the generate the plurality of blocks, extract the first feature, determine the second feature, and determine the third feature for each of a plurality of different scaled versions of the plurality of stored images.

Example 48 may include the one or more computer-readable media of any of examples 41-47 and/or some other examples herein, wherein the instructions further cause the computing device, in response to execution of the instructions by the computing device, to: generate a plurality of scaled first images based on the first image, each scaled first image of the plurality of scaled first images associated with a particular scale factor; generate a plurality of scaled second images based on the second image, each scaled second image of the plurality of scaled second images associated with the particular scale factor; wherein determine the correlation between at least the first ROI of the first potential matching image and the first image comprises determining the correlation based on the third feature associated with the first potential matching image and the scaled first image from among the plurality of scaled first images; and wherein determine the correlation between at least the second ROI of the second potential matching image and the second image comprises determining the correlation based on the third feature associated with the second potential matching image and the scaled second image from among the plurality of scaled second images.

Example 49 may include the one or more computer-readable media of any of examples 41-48 and/or some other examples herein, wherein the query results is determined in accordance with a neural network approximation function.

Example 50 may include the one or more computer-readable media of any of examples 41-49 and/or some other examples herein, wherein the instructions further cause the computing device, in response to execution of the instructions by the computing device, to: determine, for the first image, a first set of features comprising a low resolution feature, a high resolution feature, and a low resolution version of the high resolution feature; and wherein to determine the correlation between at least the first ROI of the first potential matching image and the first image comprises determining the correlation based on the first set of features associated with the first image and the third feature associated with the first potential matching image.

Example 51 may include a computing device comprising: at least one storage device including a plurality of stored images; and at least one processor in communication with the at least one storage device, wherein the at least one processor: receives a query request comprising a first image and a second image, determines a correlation between at least a first region of interest (ROI) of a first potential matching image, from among the plurality of stored images, and the first image based on a third feature associated with the first potential matching image and the first image, wherein the first potential matching image is associated with a first feature determined from the first potential matching image, a second feature determined based on the first feature, and the third feature associated with the first potential matching image determined based on the second feature, determines a correlation between at least a second region of interest (ROI) of a second potential matching image, from among the plurality of stored images, and the second image based on a third feature associated with the second potential matching image and the second image, wherein the second potential matching image is associated with a first feature determined from the second potential matching image, a second feature determined based on the first feature of the second potential matching image, and the third feature associated with the second potential matching image determined based on the second feature of the second potential matching image, determines, as query results, an image from among the first potential matching image and the second potential matching image that has maximum correlation to both the first image and the second image, and provides the query results in response to the query request.

Example 52 may include the computing device of example 51 and/or some other examples herein, wherein the first image depicts only a portion of an object and the image determined to be the query results depicts the object.

Example 53 may include the computing device of any of examples 51-52 and/or some other examples herein, wherein the object comprises a product or a face.

Example 54 may include the computing device of any of examples 51-53 and/or some other examples herein, wherein the first feature determined from the first potential matching image comprises a vertebrate feature, the second feature comprises a fovea feature, and the third feature associated with the first potential matching image comprises a lateral geniculate nucleus (LGN) feature.

Example 55 may include the computing device of any of examples 51-54 and/or some other examples herein, wherein the first feature determined from the first potential matching image comprises a low resolution feature, the second feature comprises a high resolution feature, and the third feature associated with the first potential matching image comprises a low resolution version of the second feature.

Example 56 may include the computing device of any of examples 51-55 and/or some other examples herein, wherein the at least one processor: generates a plurality of blocks from a captured image, wherein each block of the plurality of blocks is representative of a corresponding region of the captured image, extracts a first feature of the captured image from at least one block of the plurality of blocks, determines a second feature of the captured image based at least on the first feature of the captured image, determines a third feature of the captured image based on the second feature of the captured image, and wherein the captured image comprises each stored image of the plurality of stored images.

Example 57 may include the computing device of any of examples 51-56 and/or some other examples herein, wherein the at least one processor: performs generation of the plurality of blocks, extraction of the first feature, determination of the second feature, and determination of the third feature for each of a plurality of different scaled versions of the plurality of stored images.

Example 58 may include the computing device of any of examples 51-57 and/or some other examples herein, wherein the at least one processor: generates a plurality of scaled first images based on the first image, each scaled first image of the plurality of scaled first images associated with a particular scale factor, generates a plurality of scaled second images based on the second image, each scaled second image of the plurality of scaled second images associated with the particular scale factor, wherein determination of the correlation between at least the first ROI of the first potential matching image and the first image comprises determining the correlation based on the third feature associated with the first potential matching image and the scaled first image from among the plurality of scaled first images, and wherein determination of the correlation between at least the second ROI of the second potential matching image and the second image comprises determining the correlation based on the third feature associated with the second potential matching image and the scaled second image from among the plurality of scaled second images.

Example 59 may include the computing device of any of examples 51-58 and/or some other examples herein, wherein the query results is determined in accordance with a neural network approximation function.

Example 60 may include the computing device of any of examples 51-59 and/or some other examples herein, wherein the at least one processor: determines, for the first image, a first set of features comprising a low resolution feature, a high resolution feature, and a low resolution version of the high resolution feature, and wherein determination of the correlation between at least the first ROI of the first potential matching image and the first image comprises determining the correlation based on the first set of features associated with the first image and the third feature associated with the first potential matching image.

Example 61 may include a computer-implemented method comprising: receiving a query request comprising a first image and a second image; determining a correlation between at least a first region of interest (ROI) of a first potential matching image, from among a plurality of stored images, and the first image based on a third feature associated with the first potential matching image and the first image, wherein the first potential matching image is associated with a first feature determined from the first potential matching image, a second feature determined based on the first feature, and the third feature associated with the first potential matching image determined based on the second feature; determining a correlation between at least a second region of interest (ROI) of a second potential matching image, from among the plurality of stored images, and the second image based on a third feature associated with the second potential matching image and the second image, wherein the second potential matching image is associated with a first feature determined from the second potential matching image, a second feature determined based on the first feature of the second potential matching image, and the third feature associated with the second potential matching image determined based on the second feature of the second potential matching image; and determining, as query results, an image from among the first potential matching image and the second potential matching image that has maximum correlation to both the first image and the second image.

Example 62 may include the method of example 61 and/or some other examples herein, wherein the first image depicts only a portion of an object and the image determined to be the query results depicts the object.

Example 63 may include the method of any of examples 61-62 and/or some other examples herein, wherein the object comprises a product or a face.

Example 64 may include the method of any of examples 61-63 and/or some other examples herein, wherein the first feature determined from the first potential matching image comprises a vertebrate feature, the second feature comprises a fovea feature, and the third feature associated with the first potential matching image comprises a lateral geniculate nucleus (LGN) feature.

Example 65 may include the method of any of examples 60-64 and/or some other examples herein, wherein the first feature determined from the first potential matching image comprises a low resolution feature, the second feature comprises a high resolution feature, and the third feature associated with the first potential matching image comprises a low resolution version of the second feature.

Example 66 may include the method of any of examples 60-65 and/or some other examples herein, further comprising: generating a plurality of blocks from a captured image, wherein each block of the plurality of blocks is representative of a corresponding region of the captured image; extracting a first feature of the captured image from at least one block of the plurality of blocks; determining a second feature of the captured image based at least on the first feature of the captured image; and determining a third feature of the captured image based on the second feature of the captured image; wherein the captured image comprises each stored image of the plurality of stored images.

Example 67 may include the method of any of examples 60-66 and/or some other examples herein, further comprising: performing generating the plurality of blocks, extracting the first feature, determining the second feature, and determining the third feature for each of a plurality of different scaled versions of the plurality of stored images.

Example 68 may include the method of any of examples 60-67 and/or some other examples herein, further comprising: generating a plurality of scaled first images based on the first image, each scaled first image of the plurality of scaled first images associated with a particular scale factor; generating a plurality of scaled second images based on the second image, each scaled second image of the plurality of scaled second images associated with the particular scale factor; wherein determine the correlation between at least the first ROI of the first potential matching image and the first image comprises determining the correlation based on the third feature associated with the first potential matching image and the scaled first image from among the plurality of scaled first images; and wherein determine the correlation between at least the second ROI of the second potential matching image and the second image comprises determining the correlation based on the third feature associated with the second potential matching image and the scaled second image from among the plurality of scaled second images.

Example 69 may include the method of any of examples 60-68 and/or some other examples herein, wherein the query results is determined in accordance with a neural network approximation function.

Example 70 may include the method of any of examples 60-69 and/or some other examples herein, further comprising: determining, for the first image, a first set of features comprising a low resolution feature, a high resolution feature, and a low resolution version of the high resolution feature; and wherein to determine the correlation between at least the first ROI of the first potential matching image and the first image comprises determining the correlation based on the first set of features associated with the first image and the third feature associated with the first potential matching image.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

I claim:

1. One or more non-transitory computer-readable media comprising instructions, wherein execution of the instructions by a computing device is to cause the computing device to:

receive a search request comprising a first image and a second image;

determine a correlation between at least a first region of interest (ROI) of a first potential matching image from among a plurality of stored images and the first image based on a second low quality feature associated with the first potential matching image and the first image, wherein the first potential matching image is associated with a first low quality feature determined from the first potential matching image, a first high quality feature determined based on the first low quality feature, and the second low quality feature associated with the first potential matching image determined based on the second high quality feature, and wherein the first high quality feature is larger in size than the first low quality feature or the first high quality feature has a same size as the first low quality feature;

determine another correlation between at least a second ROI of a second potential matching image from among the plurality of stored images and the second image based on a another second low quality feature associated with the second potential matching image and the second image, wherein the second potential matching image is associated with another first low quality feature determined from the second potential matching image, another first high quality feature determined based on the other first low quality feature of the second potential matching image, and the other second low quality feature associated with the second potential matching image determined based on the other first high quality feature of the second potential matching image, and wherein the other first high quality feature is larger in size than the other first low quality feature or the other first high quality feature has a same size as the other first low quality feature; and determine, as query results, a result image from among the first potential matching image and the second potential matching image that has maximum correlation to both the first image and the second image.

2. The one or more non-transitory computer-readable media of claim 1, wherein the first image or the second image depicts only a portion of an entire object and the result image depicts the entire object.

3. The one or more non-transitory computer-readable media of claim 2, wherein the entire object comprises a product or a human face.

4. The one or more non-transitory computer-readable media of claim 1, wherein the first low quality feature determined from the first potential matching image is a vertebrate feature, the first high quality feature is a fovea feature, and the second low quality feature associated with the first potential matching image is a lateral geniculate nucleus (LGN) feature, and wherein the other first low quality feature determined from the second potential matching image is another vertebrate feature, the other first high quality feature is another fovea feature, and the other second low quality feature is another LGN feature.

5. The one or more non-transitory computer-readable media of claim 1, wherein:

the first low quality feature is a more blurry feature than the first high quality feature or pixels in the first low quality feature have a larger size than pixels in the first high quality feature the second low quality feature associated with the first potential matching image is a more blurry version of the first high quality feature or pixels in the second low quality feature have a larger size than pixels in the first high quality feature, the other first low quality feature is a more blurry feature than the other first high quality feature or pixels in the other first low quality feature have a larger size than pixels in the other first high quality feature, and the other second low quality feature is a more blurry version of the other first high quality feature or pixels in the other second low quality feature have a larger size than pixels in the other first high quality feature.

6. The one or more non-transitory computer-readable media of claim 1, wherein execution of the instructions is to cause the computing device to:

generate a plurality of blocks from the first image or the second image, wherein each block of the plurality of blocks is representative of a corresponding region of the first image or the second image;

extract a first low quality feature of the first image or the second image from at least one block of the plurality of blocks;

determine a first high quality feature of the image based at least on the first low quality feature of the first image or the second image; and determine a second low quality feature of the first image or the second image based on the first high quality feature of the first image or the second image;

control storage of the first image or the second image in association with the first low quality feature, the first high quality feature, and the second low quality feature, wherein the plurality of stored images is to include the first image or the second image upon storage of the first image or the second image.

7. The one or more non-transitory computer-readable media of claim 1, wherein execution of the instructions is to cause the computing device to:

for each of a plurality of different scaled versions of the plurality of stored images, generate a plurality of blocks from a scaled image of the plurality of different scaled versions of the plurality of stored images, wherein each block of the plurality of blocks is representative of a corresponding region of the scaled image;

extract a first low quality feature of the scaled image from at least one block of the plurality of blocks;

determine a first high quality feature of the scaled image based at least on the first low quality feature of the scaled image; and determine a second low quality feature of the scaled image based on the first high quality feature of the scaled image.

8. The one or more non-transitory computer-readable media of claim 1, wherein execution of the instructions is to cause the computing device to:

generate a plurality of scaled first images based on the first object, each scaled first image of the plurality of scaled first images associated with a particular scale factor;

generate a plurality of scaled second images based on the second object, each scaled second image of the plurality of scaled second images associated with the particular scale factor;

wherein, to determine the correlation between at least the first ROI of the first potential matching image and the first object, execution of the instructions is to cause the computing device to: determine the correlation based on the second low quality feature associated with the first potential matching image and the scaled first image from among the plurality of scaled first images; and wherein, to determine the other correlation between at least the second ROI of the second potential matching image and the second object, execution of the instructions is to cause the computing device to: determine other the correlation based on the second low quality feature associated with the second potential matching image and the scaled second image from among the plurality of scaled second images.

9. The one or more non-transitory computer-readable media of claim 1, wherein the query results are determined in accordance with a neural network approximation function.

10. The one or more non-transitory computer-readable media of claim 1, wherein execution of the instructions is to cause the computing device to:
determine, for the first image, a first set of features comprising a low resolution feature, a high resolution feature, and a low resolution version of the high resolution feature; and
Wherein, to determine the correlation between at least the first ROI of the first potential matching image and the first image, execution of the instructions is to cause the computing device to: determine the correlation based on the first set of features associated with the first image and the second low quality feature associated with the first potential matching image.

11. A computing system comprising:
communication circuitry arranged to communicate with a remote storage system and one or more client devices, wherein the storage system is arranged to store a plurality of stored images, and the communication circuitry is arranged to receive a query from a client device of the one or more client devices, wherein the query comprises an image including a first object and a second object, and send query results to the client device in response to the query request; and
processor circuitry communicatively coupled with the communication circuitry, wherein the processor circuitry is arranged to:
determine a correlation between at least a first region of interest (ROI) of a first potential matching image from among the plurality of stored images and the first object based on a second low quality feature associated with the first potential matching image and the first object,
wherein the first potential matching image is associated with a first low quality feature determined from the first potential matching image, a first high quality feature determined based on the first low quality feature, and the second low quality feature associated with the first potential matching image determined based on the first high quality feature, and wherein the first high quality feature of the first potential matching is larger in size than the first low quality feature determined from the first potential matching image or the first high quality feature of the first potential matching has a same size as the first low quality feature from the first potential matching image,
determine another correlation between at least a second region of interest (ROI) of a second potential matching image from among the plurality of stored images and the second object based on a second low quality feature associated with the second potential matching image and the second object,
wherein the second potential matching image is associated with a first low quality feature determined from the second potential matching image, a first high quality feature determined based on the first low quality feature of the second potential matching image, and the second low quality feature associated with the second potential matching image determined based on the first high quality feature of the second potential matching image, and wherein the first high quality feature of the second potential matching is larger in size than the first low quality feature determined from the second potential matching image or the first high quality feature of the second potential matching has a same size as the first low quality feature from the second potential matching image,
determine, as the query results, a result image from among the first potential matching image and the second potential matching image that has maximum correlation to both the first object and the second object, wherein the maximum correlation is a greater one among the correlation and the other correlation, and
provide the query results to the communication circuitry to be sent to the client device in response to the query request.

12. The computing system of claim 11, wherein the first object depicts only a portion of an entire object and the image determined to be the query results depicts the entire object.

13. The computing system of claim 12, wherein the object comprises a product or a face.

14. The computing system of claim 11, wherein the first low quality feature determined from the first potential matching image or the second potential matching image is a vertebrate feature, the first high quality feature of the first potential matching image or the second potential matching image is a fovea feature, and the second low quality feature associated with the first potential matching image or the second potential matching image is a lateral geniculate nucleus (LGN) feature.

15. The computing system of claim 11, wherein:
the first low quality feature determined from the first potential matching image is a more blurry feature than the first high quality feature of the first potential matching image or pixels in the first low quality feature have a larger size than pixels in the first high quality feature of the first potential matching image,
the first low quality feature determined from the second potential matching image is a more blurry feature than the first high quality feature of the second potential matching image or pixels in the first low quality feature of the second potential matching image have a larger size than pixels in the first high quality feature of the second potential matching image,
the second low quality feature associated with the first potential matching image is a more blurry version of the first high quality feature of the first potential matching image or pixels in the second low quality feature have a larger size than pixels in the first high quality feature of the first potential matching image, and
the second low quality feature associated with the second potential matching image is a more blurry version of the first high quality feature of the second potential matching image or pixels in the second low quality feature have a larger size than pixels in the first high quality feature of the second potential matching image.

16. The computing system of claim 11, wherein the image is a captured image, and the processor circuitry is to:

generate a plurality of blocks from the captured image, wherein each block of the plurality of blocks is representative of a corresponding region of the captured image, extract a first low quality feature of the captured image from at least one block of the plurality of blocks, determine a first high quality feature of the captured image based at least on the first low quality feature of the captured image, and determine a second low quality feature of the captured image based on the first high quality feature of the captured image, and Wherein the communication circuitry is to send the first low quality feature, the first high quality feature, and the second low quality feature to the remote storage system for storage in association with the captured image, wherein the plurality of stored images includes the captured image upon storage of the captured image.

17. The computing system of claim 11, wherein, for each of a plurality of different scaled versions of the plurality of stored images, the processor circuitry is to:

generate a plurality of blocks from a scaled image from the plurality of different scaled versions of the plurality of stored images, wherein each block of the plurality of blocks is representative of a corresponding region of the scaled image, extract a first low quality feature of the scaled image from at least one block of the plurality of blocks, determine a first high quality feature of the scaled image based at least on the first low quality feature of the scaled image, and determine a second low quality feature of the scaled image based on the first high quality feature of the scaled image.

18. The computing system of claim 11, wherein the processor circuitry is to:

generate a plurality of scaled first images based on the first object, each scaled first image of the plurality of scaled first images associated with a particular scale factor, generate a plurality of scaled second images based on the second object, each scaled second image of the plurality of scaled second images associated with the particular scale factor, wherein of the processor circuitry is to determine the correlation between at least the first ROI of the first potential matching image and the first object based on the second low quality feature associated with the first potential matching image and the scaled first image from among the plurality of scaled first images, and wherein of the processor circuitry is to determine the other correlation between at least the second ROI of the second potential matching image and the second object based on the second low quality feature associated with the second potential matching image and the scaled second image from among the plurality of scaled second images.

19. The computing system of claim 11, wherein the processor circuitry is to determine the query results in accordance with a neural network approximation function.

20. The computing system of claim 11, wherein the processor circuitry is to:

determine, for the first object, a first set of features comprising a low resolution feature, a high resolution feature, and a low resolution version of the high resolution feature, and wherein of the processor circuitry is to determine the correlation between at least the first ROI of the first potential matching image and the first object based on the first set of features associated with the first object and the second low quality feature associated with the first potential matching image.

* * * * *